United States Patent [19]
Steingold et al.

[11] Patent Number: 5,537,143
[45] Date of Patent: Jul. 16, 1996

[54] INTERACTIVE COMMUNICATION SYSTEM

[76] Inventors: Harold Steingold, 407 16th St., Santa Monica, Calif. 90402; Robert O'Leary, 3000 Connor St. #6, Salt Lake City, Utah 84109

[21] Appl. No.: 249,775

[22] Filed: May 26, 1994

Related U.S. Application Data

[63] Continuation-in-part of Ser. No. 930,822, Aug. 14, 1992, abandoned.

[51] Int. Cl.$^6$ .............................. H04N 7/10; H04N 7/14; H04M 11/00
[52] U.S. Cl. ................................ 348/13; 348/6; 348/7; 379/96; 379/97
[58] Field of Search .................................. 379/93, 96, 97, 379/98; 348/6–13; 455/3.1, 3.2, 4.1, 4.2, 5.1, 6.1, 6.3; 273/439

[56] References Cited

U.S. PATENT DOCUMENTS

| | | | |
|---|---|---|---|
| 5,051,822 | 9/1991 | Rhoades | 348/13 |
| 5,218,631 | 6/1993 | Katz | 379/97 |
| 5,236,199 | 8/1993 | Thompson, Jr. | 273/439 |
| 5,327,554 | 7/1994 | Palazzi, III et al. | 348/13 |

*Primary Examiner*—Jason Chan
*Attorney, Agent, or Firm*—Anglin & Giaccherini

[57] ABSTRACT

An Interactive Communication System which solves the problem of enabling a participant (16) to participate in a broadcast program event (40) by using a dual-tone multi-frequency (DTMF) keypad (46) on an existing telephone (18) is disclosed. The broadcast program event (40) may be viewed on a television receiver (12) simultaneously with other participants (74). A computer (22) is driven by a plurality of DTMF receivers (122). The participant (16) gains access to a DTMF receiver (122) through a conventional telephone circuit (20a) terminating at a local telephone exchange (LTE). The participant (16) is prompted by the program event (40) to enter responses into the computer (22) through the DTMF receiver (122) by pressing keys (140) on the key pad (46). The DTMF receiver (122) has a digital character output (126). A microprocessor (124) processes the output (126) and sends it to a main memory (28) when enabled by associated logic (120,121,131,132,134). Viewer identification software (25) associates the responses with the participant (16) and a time stamp (50) is attached (138). Criteria software (30) sorts and evaluates the responses according to criteria instructions (35). Judging software (32) selects a winner according to judging instructions (37). Winner(s) selection software (34) supplies winner identification for announcement by the transmitting station (38). The broadcast program event (40) may include commercial messages offering incentives to purchase merchandise and services or include offers of prizes to the participant (16).

3 Claims, 14 Drawing Sheets

Microfiche Appendix Included
(1 Microfiche, 26 Pages)

Dual Tone MultiFrequency (DTMF) Tones
Generated by Telephone Keypad

CODE FOR USING TELEPHONE KEYPAD AS INPUT DEVICE
(EACH CHARACTER REQUIRES TWO KEY STROKES)

| CHARACTER | TWO KEY CODE | NOTES |
|---|---|---|
| START | ** | START OF MESSAGE |
| FINISH | ### | END OF MESSAGE |
| . (PERIOD OR DECIMAL POINT) | *# | |
| SPACE | #* | SPACE BETWEEN WORDS |
| 0 (ZERO) | 00 | |
| 1 | 10 | |
| 2 | 20 | |
| 3 | 30 | |
| ... | ... | |
| 9 | 90 | |
| A | 21 | NO DISTINCTION |
| B | 22 | BETWEEN CAPS |
| C | 23 | AND LOWER CASE |
| d | 31 | |
| e | 32 | |
| f | 33 | |
| g | 41 | |
| h | 42 | |
| i | 43 | |
| j | 51 | |
| k | 52 | |
| l | 53 | |
| m | 61 | |
| n | 62 | |
| o | 63 | |
| p | 71 | |
| q | 7* | NO q ON KEYPAD |
| r | 72 | |
| s | 73 | |
| t | 81 | |
| u | 82 | |
| v | 83 | |
| w | 91 | |
| x | 92 | |
| y | 93 | |
| z | 9* | NO z ON KEYPAD |

Fig. 9

CRITERIA SOFTWARE FLOW

JUDGING SOFTWARE FLOW

WINNER(S) ASSIGNMENT
SOFTWARE FLOW

INTERACTIVE COMMUNICATION SYSTEM

CLAIM FOR PRIORITY

The present application is a Continuation in Part application. The inventors hereby claim the benefit of priority under Section 120 of Title 35 of the United States Code of Laws for any and all subject matter which is commonly disclosed in the present application and in patent application U.S. Ser. No. 07/930,822, entitled *Participatory Television System* by Robert O'Leary, filed on 14 Aug. 1992, now abandoned.

FIELD OF INVENTION

The present invention relates to a communication system, and, more particularly, to a system that Utilizes standard television or radio and telephone systems.

REFERENCE TO MICROFICHE APPENDICES

This specification is accompanied by an Appendix recorded on microfiche which contains software that may be employed to practice the invention. The microfiche contains 1 fiche and 26 frames.

BACKGROUND OF THE INVENTION

In recent years, there have been several developments in the field of interactive communication systems involving remote participants.

In Fascenda et al., U.S. Pat. No. 4,592,546, a game of skill is disclosed, playable with a live event, for example a football game, which is being observed by the participants on their television receivers. In the participant's location, a game console, which includes a microprocessor and a keyboard, receives various game instructions and scoring information via an FM subcarrier channel. After the live event, in a very short time interval, all of the scoring and counter information from the console is downloaded to a central computer via telephone lines to be checked, verified and final standings of various participants are computed.

Tovar et al., U.S. Pat. No. 4,722,526, disclose a game method for use while viewing a sporting event in which each player is provided with a signalling device which he activates when he sees what he believes to be an infraction of the rules. The first player to correctly signal the occurrence of the infraction is awarded multiple points and subsequent signalling players are awarded lesser points or penalized for not signalling. At the end of the game, the player with the highest score is the winner. A signalling device disclosed includes a set of push buttons in association with a microprocessor.

In Pearson et al., U.S. Pat. No. 5,018,736, an interactive contest system is provided which permits competition among a plurality of remote participants. The system includes a central controller, storage devices for storing a Contest Roster, from which each participant selects a team roster of athletes, a plurality of Touch-Tone™ telephones linked to the controller and a publication such as a newspaper distributed to all of the participants. The contest is based on each participant's score as a function of his team's athletes statistics.

A control system which interfaces a multiplicity of individual terminals through a telephone network facility to accommodate game formats is disclosed in Katz, U.S. Pat. No. 5,218, 631. Callers are prompted by voice-generated instructions to provide digital data for processing by a computer. Key contest data is held accessible in a cache memory for reporting.

In Lockton, U.S. Pat. No. 5,083,800, a game playable by remote participants in conjunction with a common event, such as a computer game, provides a template of the game on a floppy disk for use with the remote users' personal computers. By connection to a mass communications one way channel, such as an FM subcarrier audio channel, game parameters and characteristics are broadcast to all participants at the same time. These characteristics initialize characteristics of the game and provide updated playing parameters. A score can later be uploaded to the central station, for example by telephone lines.

Use of conventional communication networks to carry participant's data is too slow or erratic for reliable use in selecting winners of games where a race against the clock is a factor. Additionally, use of "900" numbers adds a needless expense. The requirement of purchasing viewer-based computing equipment in some prior art is a significant deterrent to many potential participants.

The problem of providing an interactive communication system which will enable a broadcast recipient to take part in various activities, such as competitive races against time for prizes, using his existing telephone equipment, while incurring little or no cost, has presented a major challenge to system designers. Such a system, which allows, for example, a television viewer, cable customer, direct satellite user, or radio broadcast listener to participate in various broadcast program events, would represent a major technical advance and satisfy a long felt need in the interactive communications industry.

SUMMARY OF THE INVENTION

The Interactive Communication System method and apparatus disclosed and claimed solves the problem of enabling a broadcast recipient, for example, a television viewer, to participate in various broadcast program events transmitted by a broadcaster from a transmitting station, using his or her existing telephone, while incurring little or no additional expense.

As used in this specification and in the claims, the terms "broadcast" and "broadcasting" refer to transmission of signals from a source such as a radio or television transmitting station and antenna, a coaxial cable, a fiber optics cable or a satellite relay. "Broadcaster" refers to the person or persons who control, manage, make, or prepare the program event or transmit the television or radio signals.

In accordance with the present invention, a participant views a broadcast televised program event on a television receiver simultaneously with other participants. The participant may be remote from the others. He or she may be viewing the event from his or her own premises and each one of the other participants may be viewing from their own premises. In some embodiments, some of the other participants may be located at the site where the broadcast originates.

The Interactive Communication System includes a computer system which is driven by a plurality of dual-tone multifrequency (DTMF) receiver/microprocessor devices, one of which is accessed by the participant through a conventional telephone circuit. The telephone circuit is one of a very large number of telephone circuits which terminate at a local telephone exchange. The computer system may be located at or nearby the local telephone exchange to maximize the number of participants who can access the computer system without unduly burdening the telephone circuits. Each one of the DTMF receiver/microprocessor devices has a DTMF receiver which has an input coupled to a telephone circuit through the local telephone exchange. Each one of the DTMF receivers has a digital character output and a steering logic (StD) output signal which indicates that a valid DTMF character is received and the digital character output is ready to be read.

A "dedicated" microprocessor is associated with each one of the plurality of DTMF receivers. The microprocessor responds to the leading edge of the steering logic (StD) signal, accepts the digital character output of the associated DTMF receiver and stores it in a microprocessor memory. The digital character output is temporarily saved in a sequence in the microprocessor memory. In this manner, the keypad output activity of the participating viewer's telephone is continually monitored in real time and stored in the microprocessor memory. The participant enters a finish character on the DTMF keypad at the completion of a sequence of responses. Recognition of the finish character by a detector in the DTMF receiver/microprocessor device triggers the application of a time stamp to the memory sequence.

The participant communicates with the computer system by means of a telephone having a DTMF keypad. The DTMF keypad normally contains twelve keys. The telephone is connected to one of the DTMF receivers, through one of the telephone circuits, when the participant dials an appropriate telephone number and access code on the DTMF key pad. The participant is prompted by a broadcast display to take part in the televised program event. He or she takes part by entering responses into the computer system by pressing appropriate keys on the DTMF key pad of the telephone.

The computer system includes a main memory for storing in a memory sequence the digital character output of each of the DTMF receivers which is temporarily saved in respective microprocessor memories. The memory sequence represents at any moment, a sequence of each one of the participant's responses entered on the DTMF keypad and input to one of the DTMF receivers through the telephone circuit.

The microprocessor supplies a flag signal to a computer system controller when the temporarily saved digital character output sequence is complete. The computer system controller then accepts the character output sequence into the main memory. Following this, the computer system controller resets the microprocessor flag signal.

The computer system includes participant identification software, criteria software judging software, a set of judging instructions and a set of criteria instructions. The software and instructions may be provided to the computer system by the broadcaster prior to or during a broadcast program event.

A real-time clock, which may be set to Universal Coordinated Time (UCT) to coordinate time in disparate time zones, provides a time synchronization signal from which is derived the time stamp for each memory sequence. The time stamp represents a time when the response sequence is completed by entry of a finish character by the participant. In certain implementations, the real time clock may be used to record the time when the sequence is started.

The participant identification software associates the responses with the participant entering them. The criteria software sorts and evaluates the responses according to the set of criteria instructions supplied to the computer system. The judging software sorts the responses by their time stamp and selects a winner or winners of the televised program event according to the set of judging instructions supplied to the computer system. Winner(s) assignment software, ancillary to the judging software, then supplies the identification of the winner or winners to the broadcaster for announcement.

The televised program event may include commercial messages offering incentives to purchase merchandise and services. It may also include offers of prizes to viewers who make complete, accurate and timely responses as requested by the broadcaster. The televised program event may include a game having as an objective, quickly and correctly identifying recognizable subject matter and information about the subject matter, such as a motion picture scene. Such a game may include a number of time intervals during which all televised action stops prior to a branching point, allowing time for the participant to choose which branch will be taken and make a response.

An appreciation of other aims and objectives of the invention and a more complete and comprehensive understanding of this invention may be achieved by studying the following description of preferred and alternative embodiments and by referring to the accompanying drawings.

BRIEF DESCRIPTION OF THE DRAWINGS

FIG. 1 shows a schematic illustration in which a television viewer is viewing the beginning of a televised program event. The figure illustrates the flow of activity, the source of the televised program event, the telephone and keypad subject to the viewer's control, and elements of the computer system which is a part of the invention.

FIG. 2 depicts a schematic illustration in which a television viewer is invited to play a game and begins playing the game by dialing a telephone number and access code on the telephone keypad.

FIG. 3 shows a schematic illustration of a television viewer providing telephone keypad responses to questions posed by a televised program event. The responses are processed by a computer system in which is placed software for evaluating the correctness and timeliness of the responses.

FIG. 4 illustrates schematically the process whereby a television viewer has successfully responded and is notified of winning a game.

FIG. 5 depicts schematically how a television viewer competes with other viewers or televised contestants.

FIG. 9 is a listing of an alphabet made up of keys on a telephone keypad, used to provide all the alphanumeric characters plus other characters necessary for this invention.

DETAILED DESCRIPTION OF PREFERRED AND ALTERNATIVE EMBODIMENTS

Figure 6:
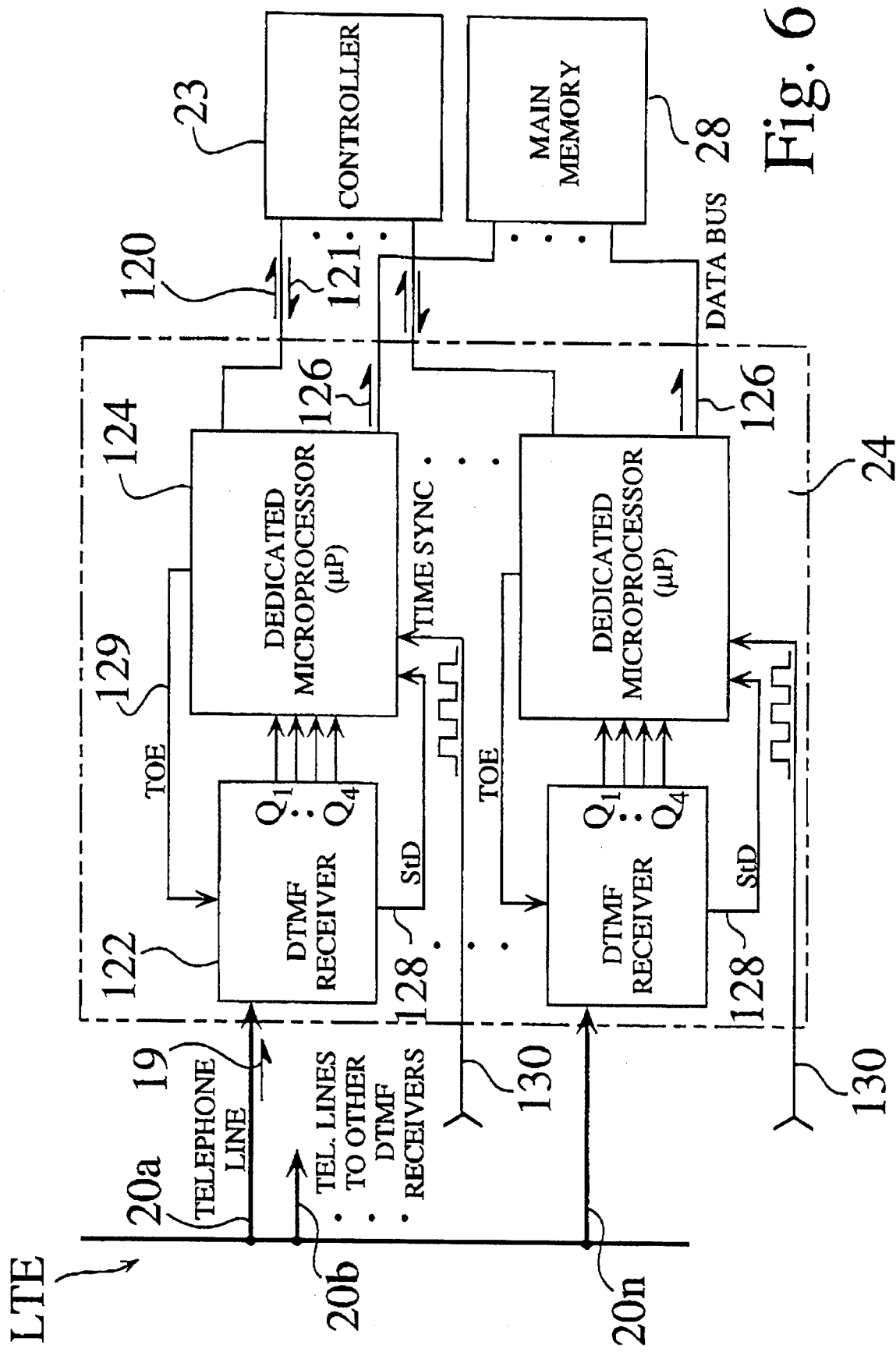
FIG. 6 is a schematic diagram of a representative DTMF receiver/microprocessor device included in the invention, showing the principal signal input from a participant's telephone keypad, output of digital character data to the computer system main memory, the DTMF receiver signal exchange with its "dedicated" microprocessor and the input/output relationship with the main memory and controller portion of the invention.
Figure 7:
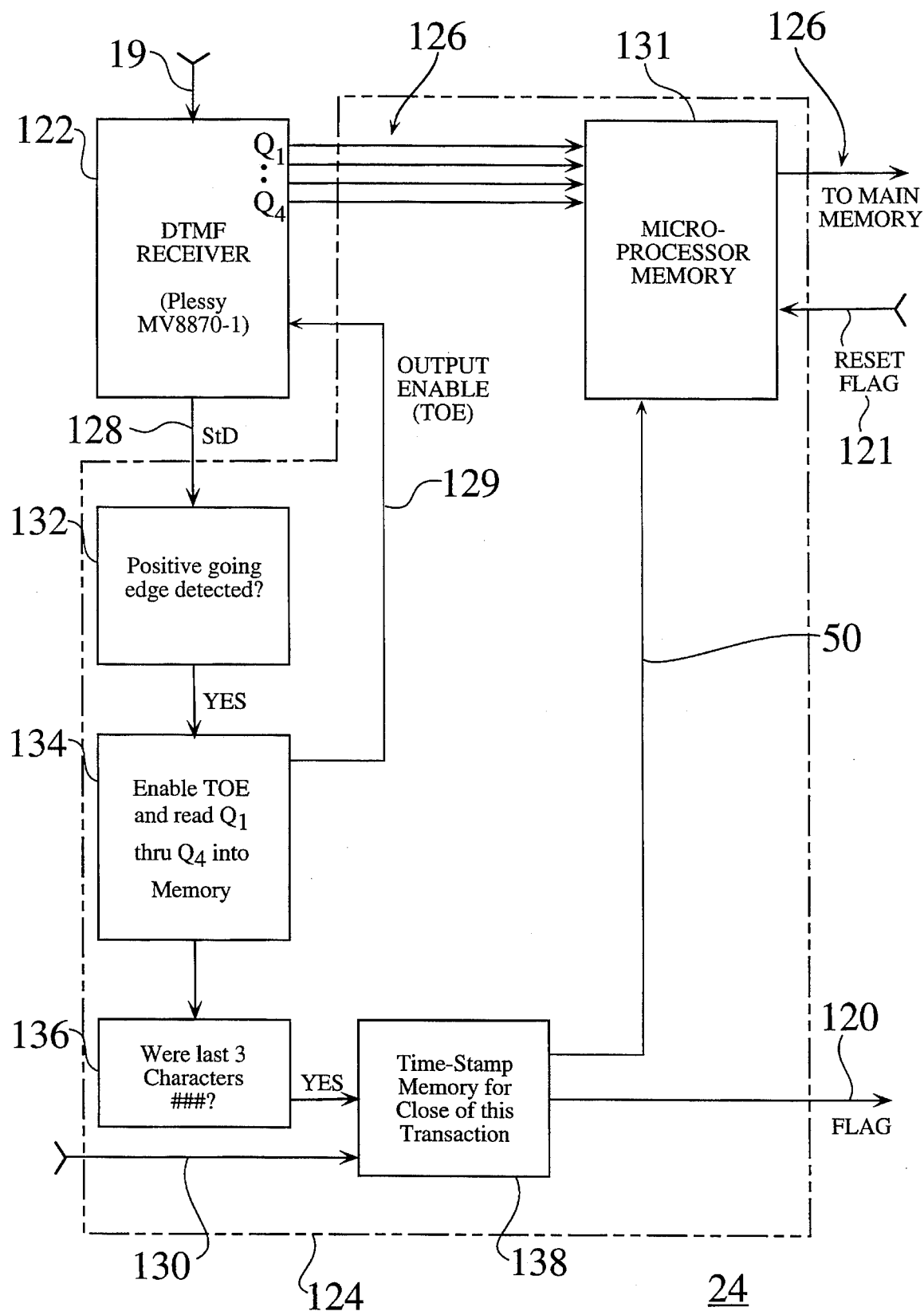
FIG. 7 is a block diagram of a microprocessor device which is associated with a DTMF receiver and forms a part of the DTMF receiver/microprocessor portion of the invention, illustrating the process which enables the digital character output from the DTMF to be temporarily saved in the microprocessor memory.
Figure 7A:
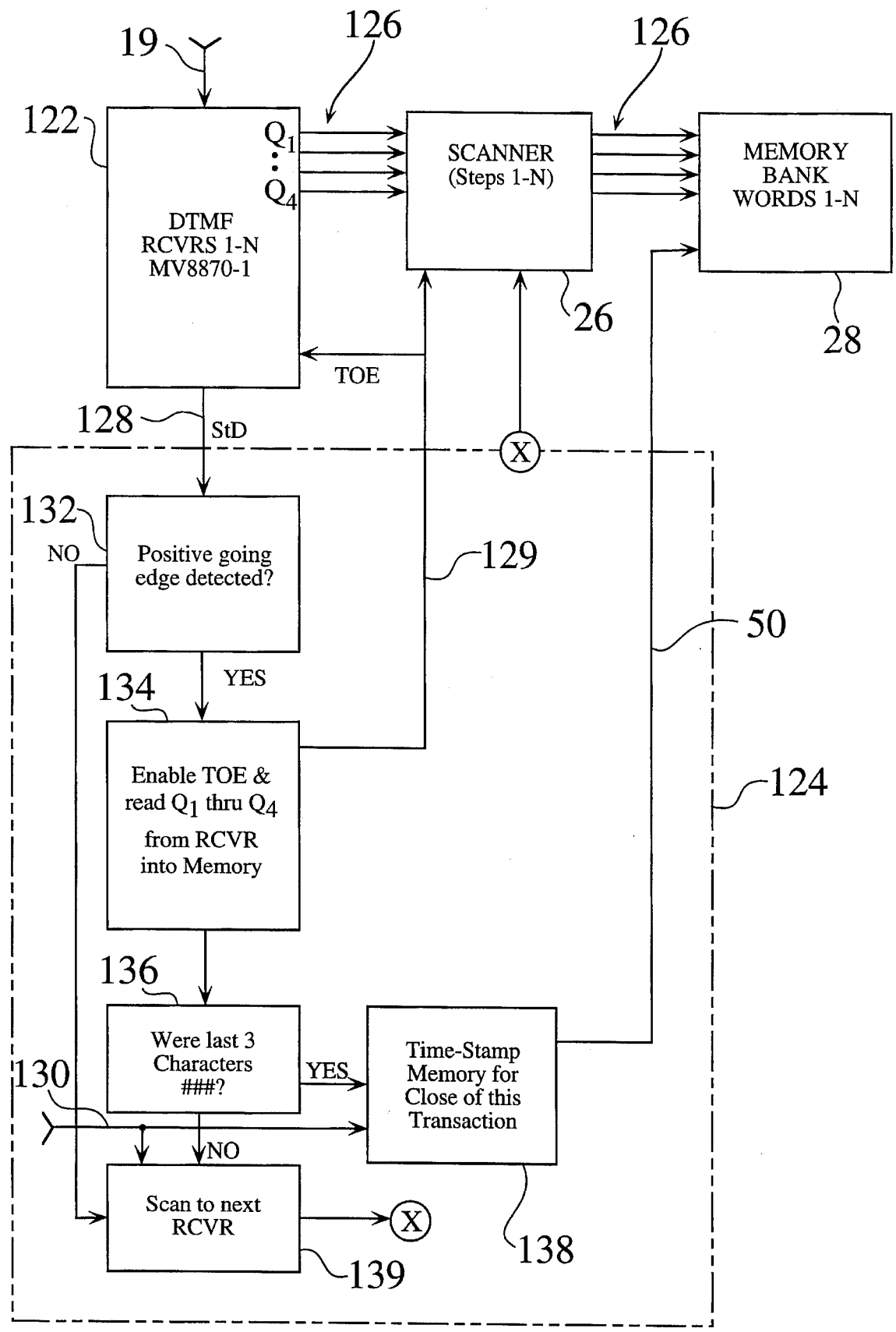
FIG. 7A is a block diagram depicting an alternative embodiment of the invention in which a scanner reads out the digital character output from a plurality of DTMF receivers. It shows the flow of operations which implement the storage of the digital character output.

Flow of Events and Apparatus Used in a Broadcast, Interactive, Televised Program Event FIGS. 1 through 5 reveal the flow of events in a broadcast, interactive, televised program event 40 and the apparatus which implements the interactive process, in a "story board" description of one of the preferred embodiments of the present invention. As used in this specification and in the claims, the terms "broadcast" and "broadcasting" refer to transmission of signals from a source 10 such as a radio or television transmitting station 38 and antenna, a coaxial cable, a fiber optics cable or a satellite relay. "Broadcaster" 36 refers to the person or persons who control, manage, make, or prepare the program event or transmit the television or radio signals. The reader is invited to refer to FIGS. 6 and 7 concerning the operation of a plurality of DTMF receiver/microprocessor devices 24. FIG. 7A illustrates operation of an alternative implementation which does not use a microprocessor.

Figure 1:
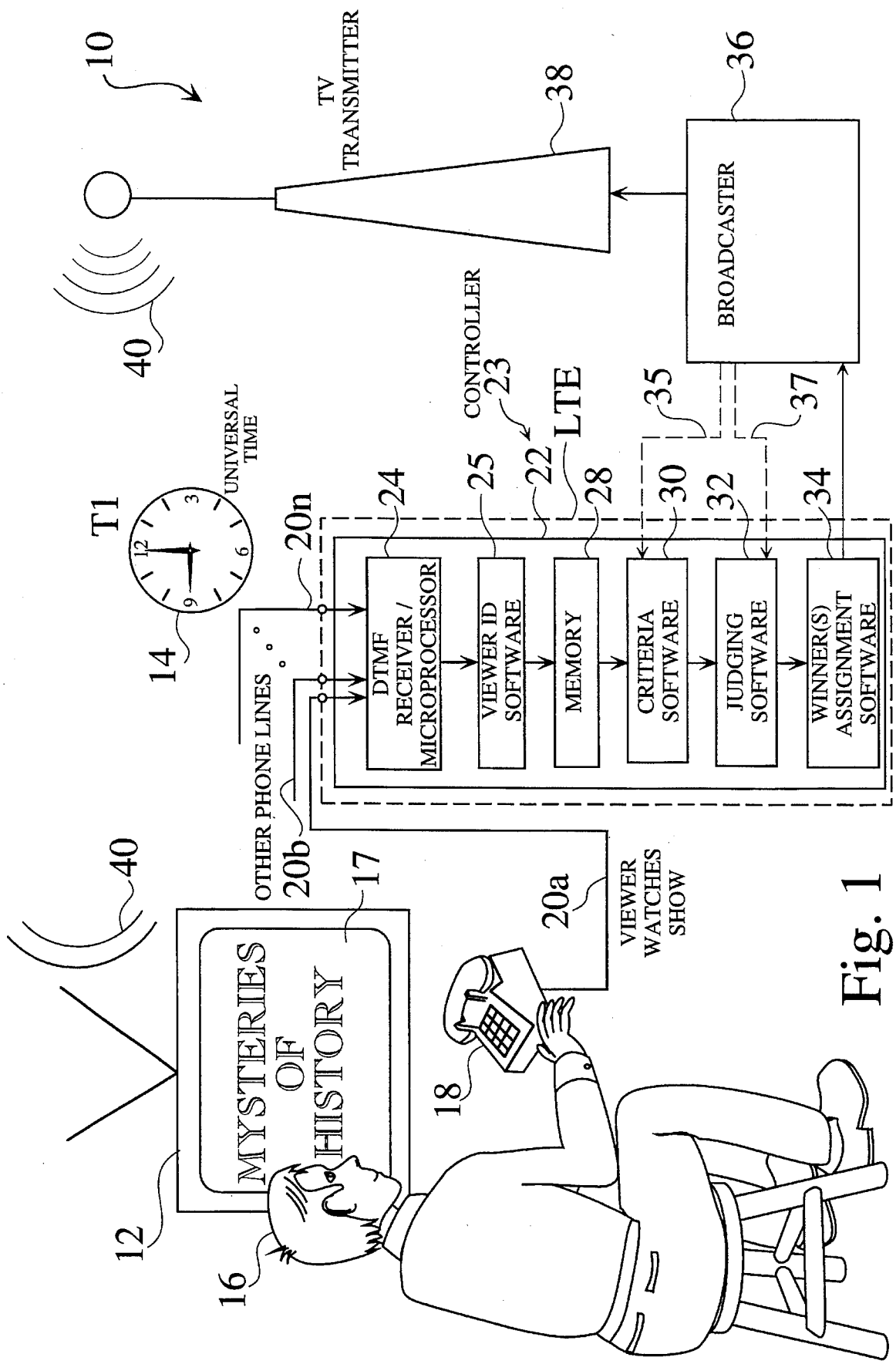
FIGS. 1 through 5 depict a "story board" description of one of the preferred embodiments of the present invention. These figures reveal the flow of events in an interactive televised program event and the apparatus which implements the interactive process.
Figure 2:
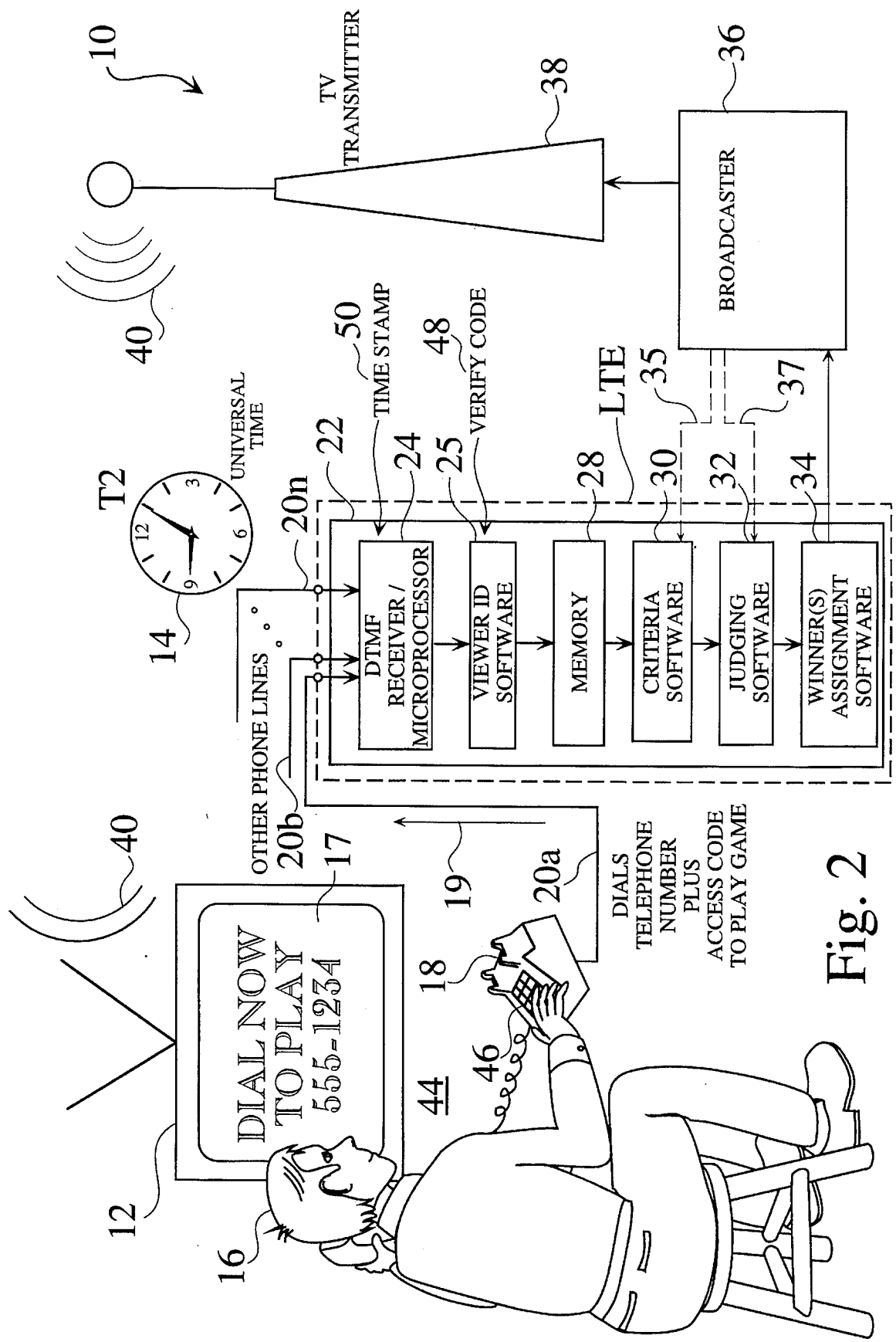
Figure 5:
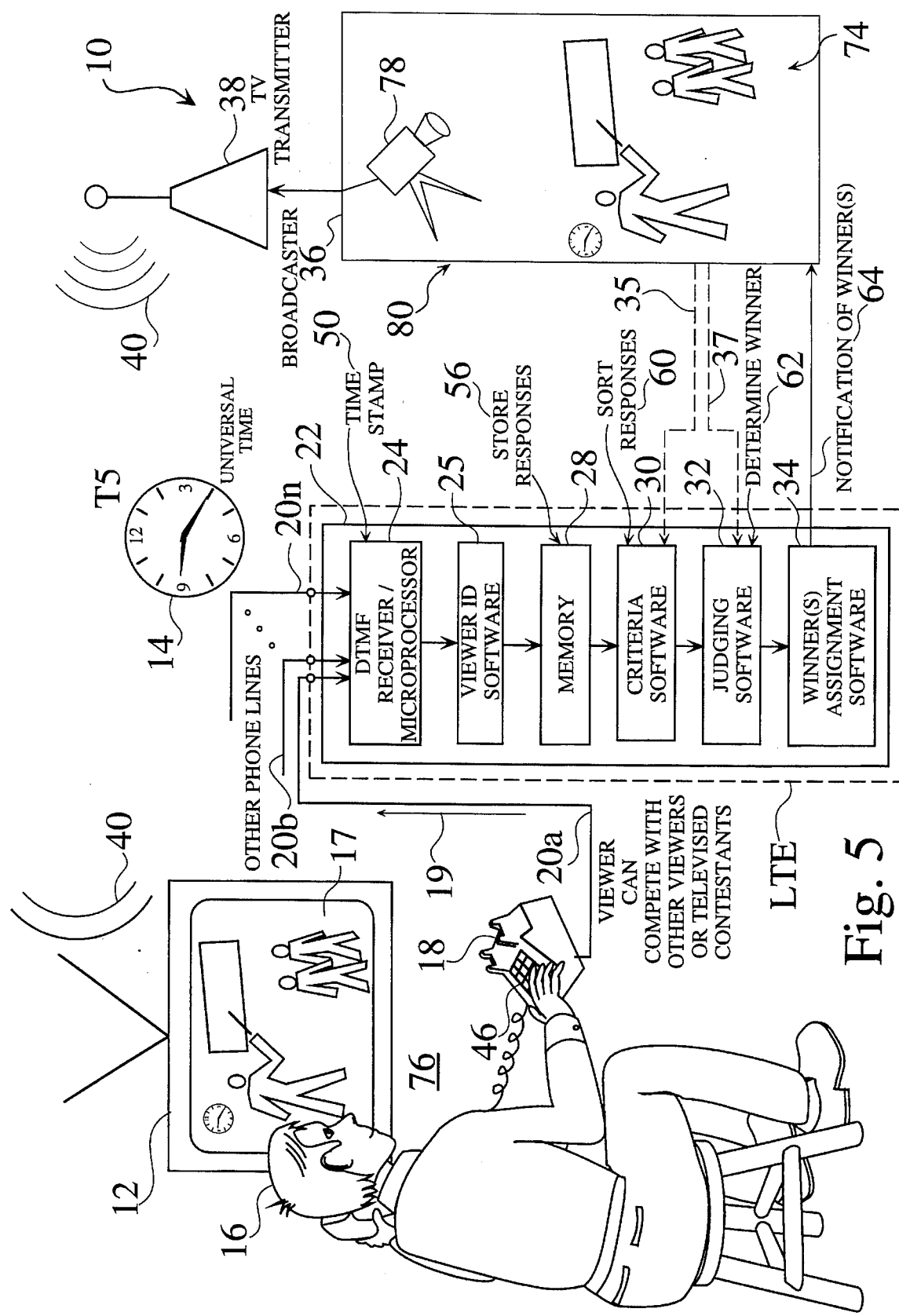

FIGS. 1 and 2 show a viewer 16 viewing a broadcast of a televised program event 40 on a conventional television receiver 12. In this embodiment, the source 10 of the broadcast is a broadcaster 36 who transmits the televised program event 40 from a television station 38. The viewer 16 has at his disposal, a conventional, Touch Tone™ telephone 18. The Touch Tone™ telephone 18 is equipped with a keypad 46 which generates dual-tone multifrequency (DTMF) signals 19. The telephone 18 is connected to a telephone line 20a. The telephone line 20a terminates at a local telephone exchange LTE. Also terminated at the local telephone exchange LTE are other telephone lines 20b through 20n which may be connected to Touch Tone™ telephones 18 located on the remote premises of other viewers who are simultaneously watching the same television program event 40. About 30,000 telephone lines terminate at a typical local exchange in an urban area. The actual number of lines may vary from about 500, in a rural area, to 50,000 in some urban areas. In some embodiments of the invention, as depicted in FIG. 5, other participants 74 may be located at the source of the broadcast 10.

A plurality of DTMF (dual tone multifrequency) receiver/ microprocessor devices 24 are provided at the local telephone exchange LTE. The DTMF receiver/microprocessor devices 24 are the front-end of a computer system 22, having a controller 23. The receiver/microprocessor devices 24 may be located at the local telephone exchange LTE, at the site of the broadcaster 36, or at another convenient location. When the computer system 22 is located at or near the local telephone exchange LTE, the computer system 22 can be more easily connected simultaneously to the telephone lines 20a through 20n without adversely affecting the telephone system.

The viewer 16 gains access to the computer system 22 through one of a plurality of DTMF receiver/microprocessors 24 after the viewer 16 dials an appropriate number and access code. A typical one of the plurality of DTMF receiver/microprocessors 24 has a dual-tone multifrequency receiver 122 having an input which is coupled to a first telephone line 20a through the local telephone exchange LTE. Each one of the plurality of DTMF receiver/microprocessor devices 24 has a digital character output 126 which represents the keys 140 pressed by the viewer 16 on the telephone keypad 46. The operation of the receiver/microprocessor 24 is further described below.

The viewer 16 may be prompted to enter an identification code for association with the viewer's keypad output 19. Alternatively, a caller identification number, supplied by some telephone systems when the viewer 16 dials into the local telephone exchange, may be captured by the computer system 22 and used for viewer identification by the viewer identification software 25.

Upon receipt of a finish code (###), and after time stamping (described further below), the DTMF receiver/ microprocessor 24 supplies a data stream of the digital character output 126 to a viewer identification software 25. If the viewer identification software 25 is satisfied that the data is from a valid source, the data then goes to a main memory 28 where the digital character output 126 is stored for further processing. The data stream represents all the viewer's responses from a start signal (**) to a finish signal (###), manifested as keypad output 19 from the telephone keypad 46.

Criteria software 30 operates on the responses, sorting the stored digital character output 126 for correctness. The computer system 22 may be programmed prior to the start of a particular broadcast program event 40 with a set of criteria instructions 35. The result of processing by the criteria software 30 is an initial stage of a contest winner selection of a set of preliminary contenders, to be judged further by a judging software 32.

Judging software 32 determines an apparent contest winner. The judging software 32 is programmed with a set of judging instructions 37. It is supplied to the computer system 22 prior to or coextensive with the broadcast of the televised program event 40. The judging software 32 may evaluate the digital character output 126 derived from the viewer's keypad output 19 on the basis of the viewer's response time. It also determines whether the viewer 16 is using artificial aids such as a personal computer.

Winner(s) assignment software 34 performs the tasks of final selection of the winner(s), recording the winner(s) and providing notification of results 64 to the broadcaster 36.

FIG. 2 shows the television viewer 16 being prompted 44 to participate in a contest which is the subject matter of a televised program event 40. For example, a display 17 of a number to call may be placed on the screen of the television receiver 12. The viewer 16 then dials the requested telephone number and an access code on the telephone keypad 46 to prepare for his or her participation in the televised program event 40. This action connects the viewer's telephone 18 to the computer system 22 over the first telephone line 20a.

The computer system 22 assigns the viewer's telephone line 20a to a first DTMF receiver/microprocessor 24. A time stamp 50 derived from a local reference clock 14, which may be set to Universal Coordinated Time T1–T5, is attached to the digital character output 126 by the microprocessor.

Figure 3:
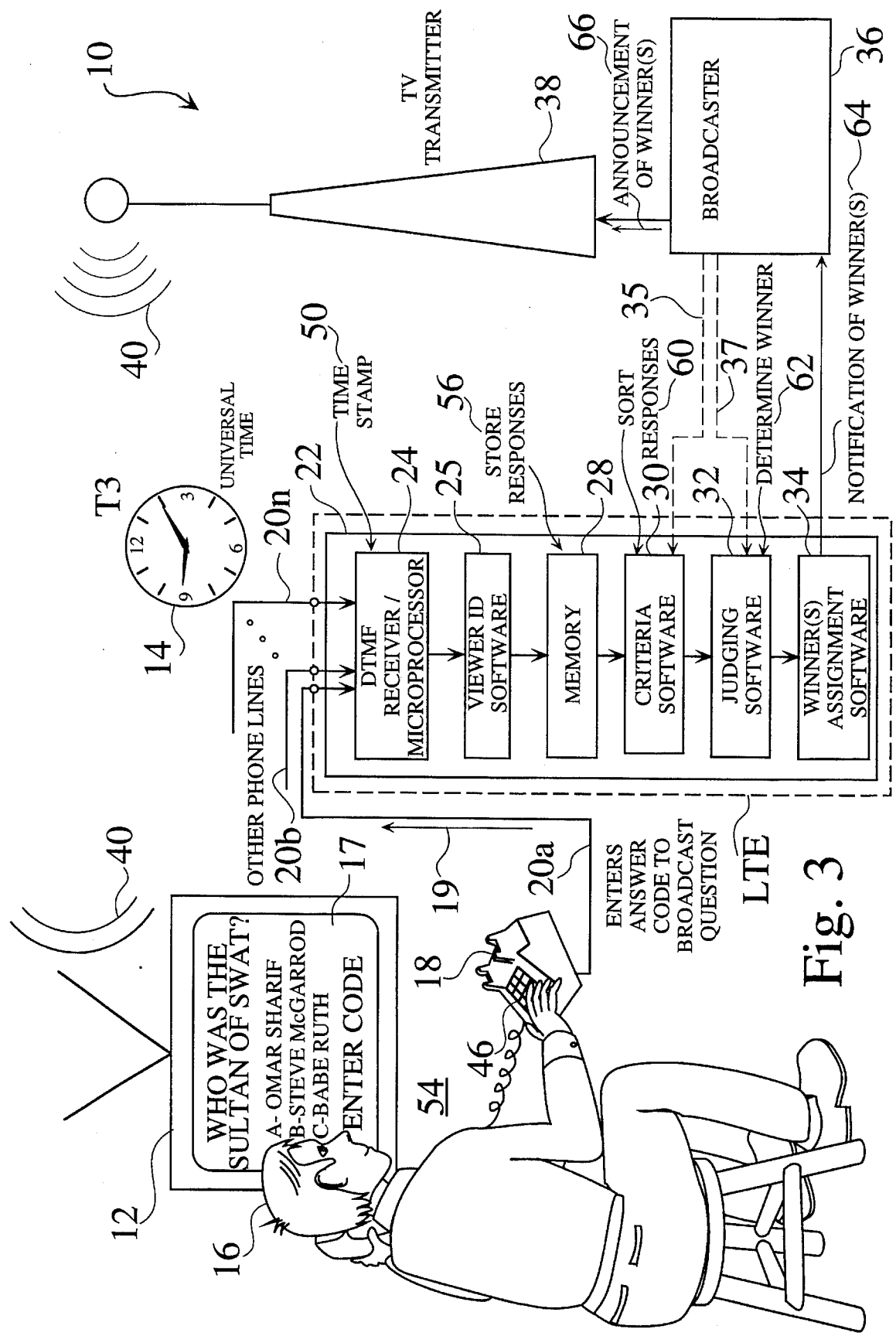

FIG. 3 depicts the viewer 16 being prompted 54 to respond to questions posed by the televised program event 40. The viewer 16 does so by entering responses into the computer system 22 via keypad output 19, achieved by the viewer 16 pressing appropriate keys on the DTMF key pad 46 of the telephone 18.

Each character derived from the viewer's keypad output 19 is read out by the first DTMF receiver/microprocessor 24 as the digital character output 126. If the viewer 16 does not complete his or her response, by entering a finish symbol (###), the microprocessor does not read the incomplete digital character output 126 into the main memory 28 of the controller 23. The microprocessor does not raise a flag 120.

Completed responses, represented by the digital character output 126 ending with a finish symbol (###), are placed in the main memory 28. These completed responses are sorted, along with completed responses from other viewers, by the criteria software 30, and passed to the judging software 32 which then determines the winner(s). A winner is recorded by the winner(s) selection software 34 which provides notification 64 to the broadcaster 36 of the winner(s). The broadcaster 36 then prepares an announcement of the winner(s) 66 for transmission from the television transmitter 38. The winner's identification is then broadcast 70.

Figure 4:
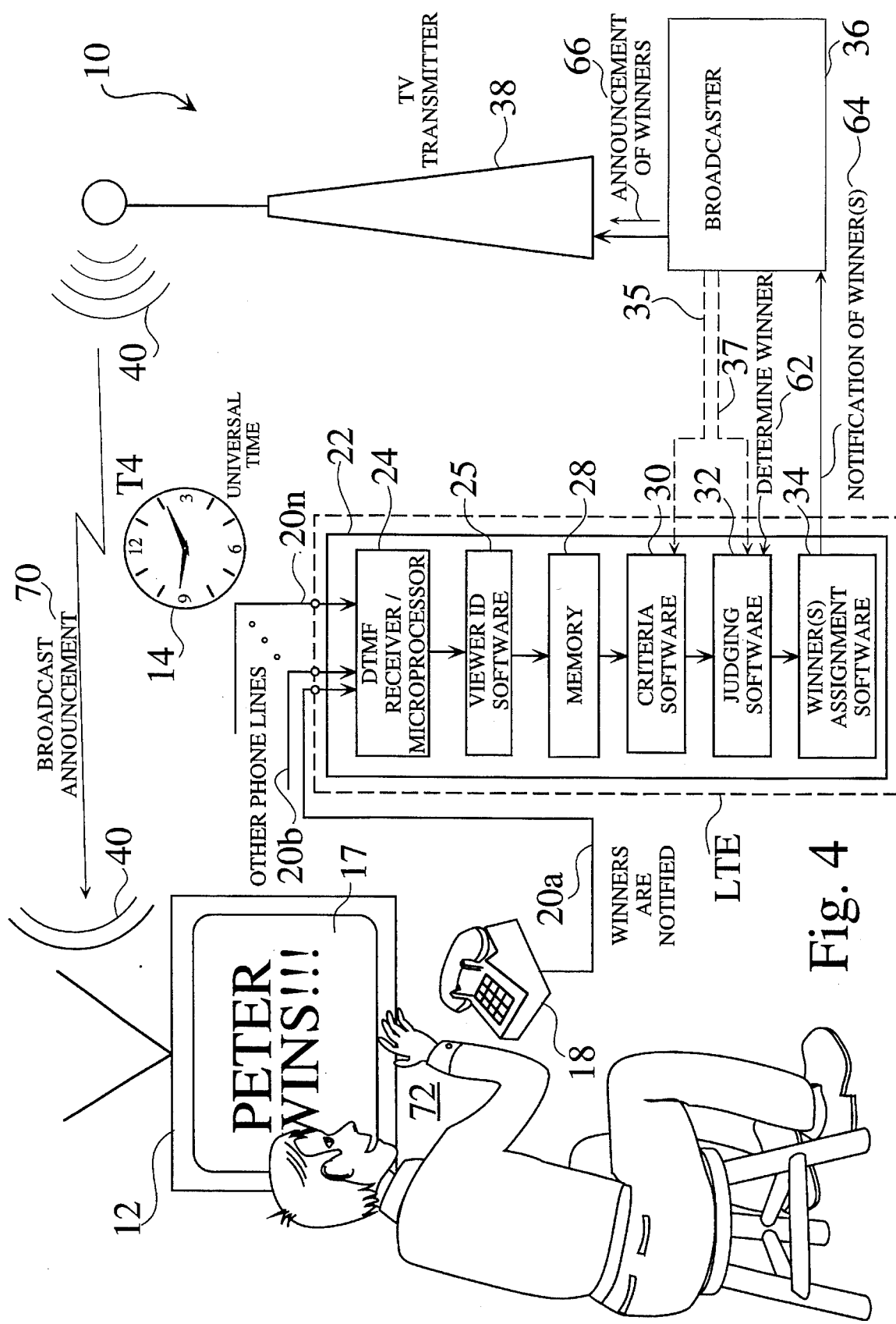

FIG. 4 shows the viewer 16 receiving the broadcast announcement 70 of the winner. The televised program event 40 then may continue with other contest questions, a new game, or other activities. The televised program event 40 may include commercial messages offering incentives to purchase merchandise and services. It may also include offers of prizes to a viewer 16 who makes complete, accurate and timely responses as requested by the broadcaster 36. The televised program event 40 may include a game having as an objective, quickly and correctly identifying recognizable subject matter and information about the subject matter, such as a motion picture scene. Such a game may include a number of time intervals during which all televised action stops prior to a branching point, allowing time for the participant to choose which branch will be taken and make a response.

FIG. 5 depicts an alternative embodiment of the invention in which a viewer 16 is prompted to compete 76 in a live televised broadcast 80 in which studio contestants 74 as well as other remote viewers participate.

Data Processing Apparatus Used in the Invention

The DTMF receiver/microprocessor 24 includes a DTMF receiver 122 and a dedicated microprocessor 124. FIG. 6, and 7 show schematically how the keypad output 19 from the telephone 18 is accepted by the DTMF receiver/microprocessor 24 and processed for storage in the memory.

FIG. 6 shows that once the telephone 18 is connected to the DTMF receiver/microprocessor 24, the keypad output 19, which is the dual-tone signal generated when a key 140 is pressed on the keypad 46, causes a corresponding digital character output 126 to appear at the output Q1–Q4 of the DTMF receiver 122.

FIG. 7 is a block diagram of the microprocessor 124 which is associated with a DTMF receiver 122. It illustrates the process which enables the digital character output 126 from the DTMF receiver 122 to be saved in a microprocessor memory 131. The process flow and the structural elements which implement the flow are described below:

The DTMF receiver 122 may be, for example, a type MV 8870-1 device manufactured by GEC Plessy Semiconductors. Before "registration" of the keypad output 19 which contains the dual-tone signal, the DTMF receiver 122 checks for a valid signal duration, referred to as a character recognition condition. Provided the character recognition condition is maintained for the validation period, the DTMF receiver 122 "registers" the dual-tone signal and strobes a corresponding four-bit code into an output latch. After a short delay to allow the output latch to settle, a steering logic (StD) signal 128 is output to a steering logic edge detector 132.

"Positive going edge detected?" 132

If the microprocessor steering logic edge detector 132 detects a positive going edge of the steering logic signal 128, a signal indicating the StD signal 128 has gone positive is sent to an output enable logic 134.

"Enable TOE and read Q1 through Q4 into memory" 134

The output enable logic 134, upon receiving the signal indicating the StD signal 128 has gone positive, provides an output enable signal 129 to the three-state output enable (TOE) pin of the DTMF receiver 122. When this signal is applied to the DTMF receiver, the contents of the output latch are sent to four binary outputs Q1,–Q4 of the DTMF receiver 122. The keypad output 19 is thereby represented by the states of these four binary outputs Q1,–Q4 which are referred to as the digital character output 126. The digital character output 126 of the DTMF receiver 122 is stored in a sequence in a microprocessor memory 131 until the digital character output 126 string is complete. At that point, the microprocessor 124 signals by a flag 120 that the string is complete. The computer system controller 23 then calls for the memory sequence to be transferred to the main memory 28. In the manner just described, the keypad output 19 activity of the participating viewer's telephone 18 is continually monitored in real time and saved in the microprocessor memory 131.

Were last three characters '###' 136

To signify the end of a response, the viewer 16 enters a finish character on the keypad 46. The finish character, for example three pound signs '###', is detected by a finish character detector 136 which in turn triggers a time stamp function 138.

"Time stamp memory for close of transaction" 138

The time stamp function 138 is internal to the microprocessor 124. It applies a time stamp 50 to the digital character output 126 sequence just stored in the microprocessor memory 131 and provides a flag signal 120 to the computer system controller 23 to indicate that inputs from the viewer 16 are complete. A one Megahertz (Mhz) time synchronization signal 130 is supplied by the reference clock 14 to the time stamp function 138. The time synchronization signal 130 is accurate to one millisecond or better.

When the memory stamp 50 has been attached to the digital character output 146 stored in the microprocessor memory 131, a memory sequence has been completed. At this time, the microprocessor 124 sets the flag signal 120. This indicates to the computer system controller 23 that data is available to be transferred to the main memory 28. As soon as the main memory 28 has accepted the completed memory sequence from the microprocessor memory 131, the computer system controller 23 supplies a flag reset signal 121 to the microprocessor 124. The DTMF receiver/microprocessor 24 is now ready to accept data for the next broadcast program event.

FIG. 7A is a block diagram depicting an alternative embodiment of the invention which has no microprocessor 124. A scanner 26 reads out the digital character output 126 from the plurality of DTMF receivers 122. The process flow is essentially similar to that depicted in FIG. 7. In this embodiment, the scanner output 126 is enabled by the output enable logic 134 simultaneously with the enabling of the DTMF receiver output bus Q1,-Q4. Because of the possibility that the keypad output 19 of one viewer 16 could be scanned more than once each time a key 140 is pressed by the viewer 16, it is necessary to assure that only one digital character output 126 signal is read into memory 28 for each key 140 pressed by the viewer 16. The microprocessor 124 performs this function. The detection of a positive-going edge causes a three-state output enable signal (TOE) to be actuated for one clock cycle. After this clock cycle, the TOE is inactive until the next positive-going edge is detected. The output enable signal 129 allows the digital character output 126 of the DTMF receiver 122 to pass through the scanner 26 directly to the main memory 28 for the duration of one scan period only. This logic assures that for each key on the keypad 46 pressed by the viewer 16, only one character is stored in the memory 28 at an address block 56 associated with and dedicated to the telephone 18 of the viewer 16.

The MV 8807-1 DTMF receiver 122, in order to provide a valid digital character output 126, requires that the keypad output 19 signal must appear at the DTMF receiver 122 input for a nominal eleven milliseconds. This time may be as short as five milliseconds and as long as fourteen milliseconds. A typical rate for the reference clock 14 is one megahertz (Mhz). Thus, if some large number of DTMF receivers 122, say five thousand, were connected to one scanner, it would take a maximum of five thousand microseconds to read out the last digital character indicating finish of the memory string (#). Therefore, there is a maximum possible error of five milliseconds in the time stamp 50 attached to the memory string. The value of this error is much less than human reaction time, typically over 100 milliseconds. The error is inconsequential.

For a televised program event 40 in which a "race" against time is a factor in deciding a winner, it is of course, important to reduce the error or uncertainty as to which viewer 16 had the fastest response time. The largest possible error is the time of one full scan cycle. The maximum error in time measurement is therefore $1 \times 10^{-6}$ seconds for a time synchronization signal rate of one megahertz.

Figure 8:
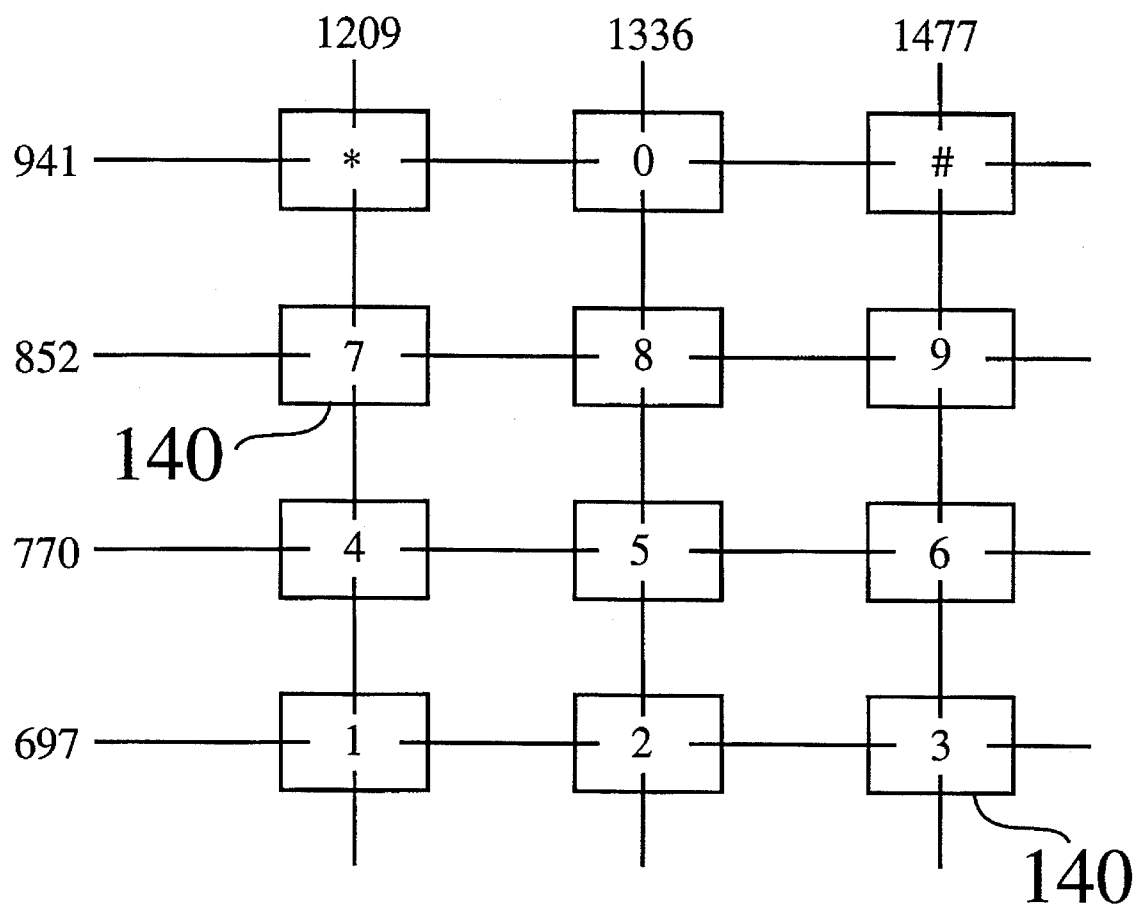
FIG. 8 is a schematic diagram of a telephone keypad, illustrating the dual-tone frequencies which are generated by pressing each key.

FIG. 8 depicts schematically a standard, Touch Tone™ telephone keypad 46. As shown in FIG. 8, there are twelve keys on a standard keypad 46. The keys 140 are designated by numerals 0 through 9, a star (*) and a pound sign (#). The frequencies of the dual tones generated when each key is pressed can be found on the X and Y axes of FIG. 8.

FIG. 9 is a listing of a code for providing characters usable by the computer system 22 using the twelve keys 140 provided on the keypad 46. In order to obtain a useful alphabet including the 26 letters, 10 decimal numbers, and such ancillary characters as space, start, stop, and decimal point, it is necessary for the viewer 16 to use two keys 140 to represent each character. Each such pair of keystrokes may be considered a character in an alphabet. Much of the code shown in FIG. 9 is already used as a keypad alphabet to obtain stock market quotes over the phone.

System Activities Flow

Figure 10:
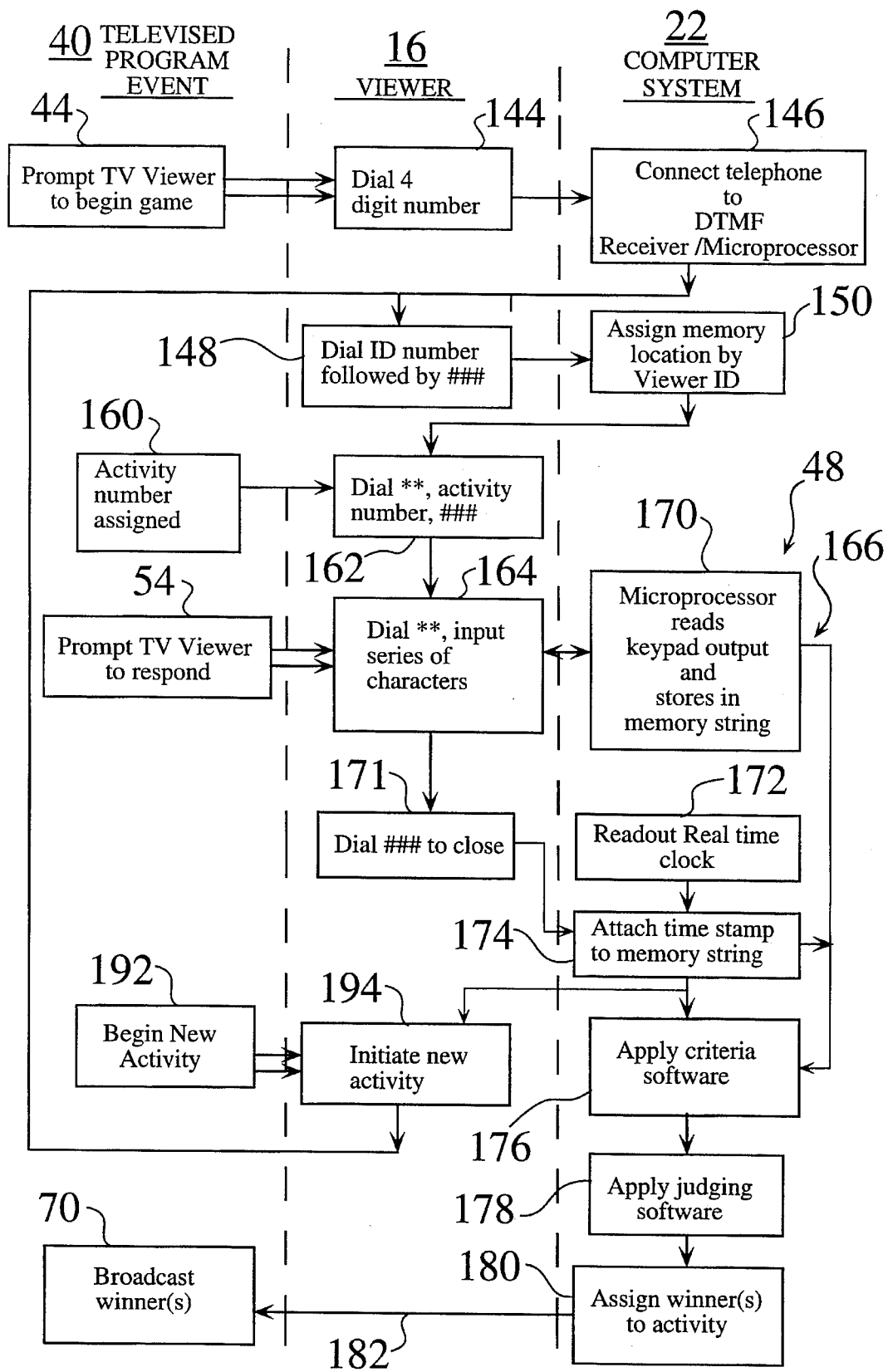
FIG. 10 is a flow diagram schematically showing the typical flow of process activities which form the invention, beginning with prompting a viewer to begin a game and ending with the broadcast announcement of a winner.

FIG. 10 is a flow diagram schematically showing a typical flow of system activities which form a preferred embodiment of the invention. The steps are described below.

"Prompt TV viewer to begin a game" 44

A viewer 16 is prompted 44 to begin a game as a result of a message presented in a display 17 on the screen of a television set 12 by the televised program event 40.

"Dial 4 digit number" 144

The viewer 16 dials a telephone number, assigned by the telephone company and reserved for this particular televised program event 40, to access the computer system 22.

"Connect telephone to DTMF Receiver/Microprocessor" 146

The computer system 22 connects the viewer's telephone 18 to a DTMF receiver/microprocessor 24 which is one of a plurality of DTMF receivers 122 included in the DTMF Receiver/Microprocessor device 24. The Interactive Communication System may be operated so that there is no charge to the viewer 16 during connection to the system. When the computer system 22 which includes the DTMF receiver 122 is located proximately to the local telephone exchange, the telephone communication may be carried on without affecting other telephone lines 20b,–20n than the viewer's telephone line 20a.

"Dial ID number followed by '###'" 148

The viewer 16 enters his or her identification number from the keypad 46 followed by a finish command, for example three pound signs '###'. The number may be the number of the viewer's telephone 18 or a number assigned to the viewer 16 by prearrangement. The finish command (###) indicates to the computer system 22 that no further input is to be accepted from the viewer 16 except a start command.

"Assign memory location by viewer ID" 150

The computer system 22 assigns a memory address block 56 dedicated to the viewer 16. The viewer identification number is used to uniquely identify the memory address block 56 to the viewer 16. One memory address block 56 is assigned for each connected telephone 18.

"Activity number assigned" 160

The televised program event 40 assigns an activity number to each particular game, contest, or other activity and presents a display 17 of this to the viewer 16 on the screen of the television receiver 12.

"Dial '', activity number, '###'" 162**

The viewer 16 enters a start command on the keypad 46, for example, two asterisks '' followed by the activity number which was presented in a display 17 on the television receiver 12 of the viewer 16. The viewer 16 indicates his entry is completed by pressing the finish command, three pound signs '###', on the keypad 46**.

"Prompt TV viewer to respond" 54

The viewer 16 is prompted to respond 54 to the game, contest or other activity which is the subject matter of the televised program event 40 by a display 17 appearing on the screen of the viewer's television receiver 12.

"Dial '', input a series of characters" 164**

The viewer 16 presses a start character such as '' and makes appropriate keypad 46** entries in response to the particular game, contest or other activity. The entry of a start character is used to signify the beginning of a response.

"Microprocessor reads out keypad responses and stores them in memory string" 170

The microprocessor 124 reads out the DTMF digital character output 126 resulting from the keypad output 19 responses of the viewer 16 and temporarily stores the DTMF digital character output 126 in the microprocessor memory 13 1. When called for by the computer system controller 23, the DTMF digital character output 126 is then stored in the main memory 28 in the memory address block 56 associated with the viewer 16. The DTMF digital character output 126 associated with the viewer 16 is read out and recorded as a continuous string in the memory block 56 so long as the viewer 16 is connected to the computer system 22.

"Dial '###' to close" 171

The viewer 16 dials the finish command (###) to indicate that he has completed his response to the game, contest or other activity. The finish command (###) may also be entered if the viewer 16 wishes to cut short his or her participation. The entry of the finish command (###) causes the time stamp 50 to be appended to the viewer's response and stored with it in the microprocessor memory 131.

"Readout Real Time clock" 1 72

The reference clock 14 provides an accurate, real time synchronization signal 130 to the computer system 22. The time synchronization signal 130 is continuously read out by the finish character detector 136 for the purpose of attaching the time stamp 50 to certain of the digital character output 126 as it is stored in the microprocessor memory 13 1. For example, it may be important in respect of ascertaining a winner of the game, contest or other event to record the time when the viewer 16 has entered a finish command (###) after a response. The reference clock 14 may be set to report Universal Coordinated Time T1–T5.

"Attach time stamp to memory string" 174

The microprocessor 124 is programmed to attach the time stamp 50 at the completion of each response and at other desired times. "Apply criteria software to memory string" 176

The primary purpose of the criteria software 30 is to determine which responses are "correct". The criteria software 30 operates on the stored digital character output 126 which represents the responses of the viewer 16 and the other viewers which were submitted to the computer system 22 by means of the keypad output 19. The criteria software 30 performs the initial stage of winner selection. Provisions may be made for the broadcaster 36 or others connected with the broadcaster 36 to supply a set of criteria instructions 35 which may be unique to a particular televised program event 40, either before or during the game, contest or other event.

The memory address block 56 is first examined to see if it is full, or if the game, contest, or other televised program event 40 has been completed by the viewer 16. If either of these tests is satisfied, the criteria software 30 then checks the responses stored in the other memory address blocks 56 and discards incorrect responses. The remaining responses are then sorted according to the attached time stamp 50.

In order to provide a "level playing field" for every viewer 16, the criteria software 30 may be programmed to discriminate against a viewer 16 who uses an artificial aid, such as a personal computer, to speed up the response time. The criteria software 30 programming operates to determine if a response time is "too fast" indicating use of such an artificial aid. If so, the viewer 16 identification is checked against a "known offender" data base of individuals who are known to use artificial aids.

The response times and correct responses from all other participating viewers are processed in the same way as just described and a list of potential winners is passed on for processing by the judging software 32. Operation of the criteria software 30 is more fully described in FIG. 11 and in the discussion presented below.

"Apply judging software" 178

The primary purpose of the judging software 32 is to determine which correct response is most "timely". Ordinarily, the earliest response is the most timely. However, the judging software 32 also must discriminate against responses which are input "too fast" to have been input manually. The judging software 32 operates on the output list of potential winners derived by the criteria software 30. The judging software 32 may determine an apparent winner based on the output list of potential winners and other bases. Provisions may be made for further processing in accordance with a set of judging instructions 37 provided by the broadcaster 36 or others which may be unique to a particular televised program event 40. A list of the apparent winner or winners selected by the judging software 32 is then passed to the winner's assignment software 34 for final processing.

The operation of the judging software 32 is more fully described in FIG. 12 and the discussion presented below. "Assign winner(s) to activity" 180

Winners' assignment software 34 operates on the list of apparent winners derived by the judging software 32. The winner's assignment software performs a uniformity check to verify that each of rules of the game, contest or other event are uniformly applied. For example, the rules of a game may not permit the same viewer 16 to win more than once in a given time period. Therefore, the winner's assignment software checks the list of apparent winners against a data base containing recent winners and eliminates those not in accordance with the rule. After applying the set of selection rules, the remaining winner or winners are recorded and the notification of the winner(s) 64 is passed to the broadcaster 36 for broadcast announcement 70.

"Broadcast winner(s)" 70

The broadcaster 36 makes a broadcast announcement 70 of the identification of the winner(s).

"Begin new activity" 192

The televised program event 40 begins a new activity and starts the cycle again by prompting the television viewer 16 to begin a new game as a result of a message presented in the display 17 on the screen of the television set 12.

"Initiating new activity" 194

The viewer 16 begins the new game, contest or other event by preparing to dial the numbers shown in the display 17 on the screen of the television set 12.

Criteria Software Flow

Figure 11:
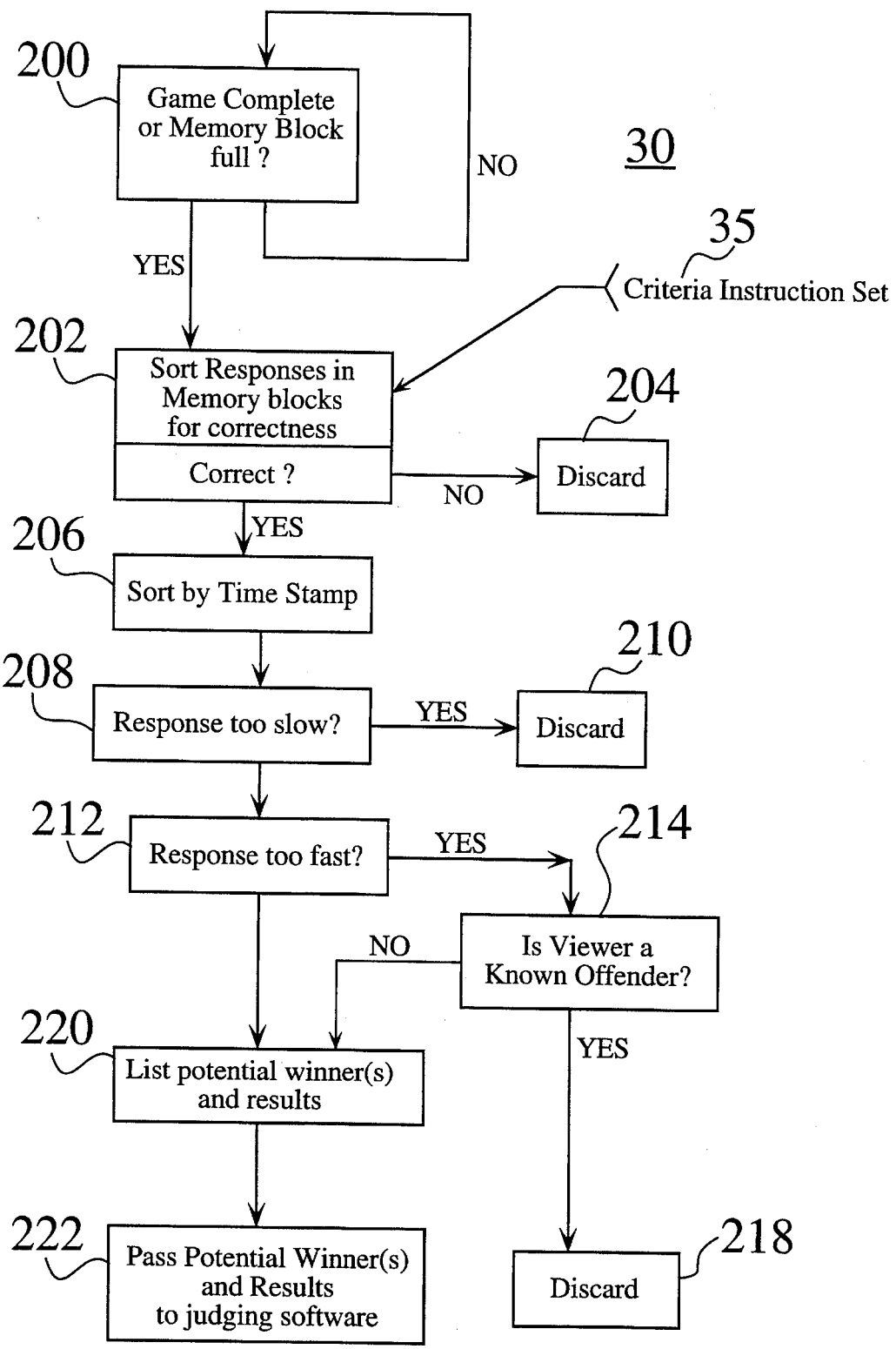
FIG. 11 is a flow diagram showing schematically the processing steps of a criteria software included in the computer system portion of the invention.

FIG. 11 is a flow diagram schematically showing a typical flow of the criteria software 30 applied to the stored digital character output 126 which represents the responses of the viewer 16 and the other viewers which were submitted to the computer system 22 by means of the keypad output 19. The criteria software may be programmed with a set of criteria instructions 35, a priori or concurrently with the broadcast program event 40. The steps are described below:

"Game complete or memory block full?" 200

The criteria software 30 continuously examines the main memory address block 56 associated with the viewer 16 to see if the viewer 16 has completed the game by entering the finish command (###) as in step 182 of FIG. 10, or whether the main memory address block 56 is filled. If either test is not satisfied, the software routine returns to wait for a finish command (###) or a memory-block-filled condition.

"Sort memory block for correctness" 202

If either the viewer 16 has entered a finish command (###) or the software detects a filled main memory block 56, a software routine checks each response of the viewer 16 for correctness.

"Discard" 204

Incorrect responses which are detected are discarded.

"Sort by time stamp" 206

The remaining, correct responses are sorted according to the time stamp 50 attached to them in step 174 of FIG. 10. A software routine subtracts the time stamp 50 attached to each response from the time that a prompt for the response was broadcast to calculate a response time interval. The prompt time may be manually input by the broadcaster 36 in synchronism with the actual flow of the broadcast program event 40. The prompt time is provided simultaneously to the controller 23 and to the broadcast participant 16, as for example via the television screen display 17. Alternatively, the prompt time may be automatically provided to the controller 23 and to the participant 16 as part of the broadcast material.

"Response too slow?" 208

If the response time interval is longer than a preset upper threshold, the response is deemed too slow and passed to step 210 as a disqualified response. If the response time interval is less than the preset upper threshold, the response is passed to step 2 12.

"Discard" 210

Response time intervals which are longer than the preset upper threshold result in the discard of the response.

"Response too fast?" 212

If the response time interval is shorter than a preset lower threshold it implies the viewer 16 is using an artificial aid, such as a personal computer, to enhance the response time this response may be disqualified and the identification of the viewer 16 passed to a 'known offender' data base search. If the response time interval exceeds the preset lower threshold, the identification of the viewer 16 submitting the response is passed on to step 220 as a potential winner.

"Is viewer a known offender ?" 214

If the response time interval is shorter than the preset threshold, the identification of the viewer 16 submitting the response is compared to a data base containing the identification of persons known to have been disqualified for using artificial aids. If the viewer's identification is not contained in the data base, the identification of the viewer 16 may be added to the list of potential winners.

"Discard" 218

If the viewer's identification is contained in the data base of known offenders, the response is then discarded.

"List potential winner(s) and results" 220

The identification of a viewer 16 who is not a known offender and is a potential winner in the game, contest or other event, together with the winning response and concomitant time stamp 50 are recorded in a file as "results data".

"Pass potential winner(s) and results data to judging software" 222

The results data recorded in step 220 are passed to the judging software 32. Judging Software Flow FIG. 12 is a flow diagram schematically showing a typical flow of judging software applied to a list of potential winners. A single computer system 22 containing the criteria software 30 and the judging software 32 may be used when the broadcast program event 40 is limited in coverage to a local area, about the area covered by the local telephone exchange LTE. When a wider-coverage area, as for example a large metropolitan area having several local telephone exchanges LTE is desired, a plurality of computer systems 22 is employed, each having its own criteria software 30. The results derived by the application of each one of the criteria software 30 routines are stored in a response file 234 which may be located within one of the plurality of computer systems 22. The judging software 34 used maybe co-located in the same computer system 22 as the response file 234. The time-stamped, correct responses and potential winners' identification resulting from processing of the criteria software 30 at each one of the plurality of computer systems 22 is sorted by the judging software according to time stamp 50. As a result of this sorting and processing, a winner or set of winners is selected. The steps are described below.

"Computer system #1 passes potential winner(s)" 230

The potential winner(s) identification and results data 220 derived from the operation of the criteria software 30 in a first computer system 22 are passed to the response file 234 to which file the judging software 32 has access.

"Computer system #m passes potential winner(s)" 232

The potential winner(s) identification and results data 220 derived from the operation of the criteria software 30 in an mth computer system 22 are passed to the response file 234.

"Response File (mx k responses)" 234

The response file 234 contains the results data produced in the first computer system 22 through the mth computer system 22. The criteria software 30 in the first telephone computer system 22 may produce results data containing up to k winners. Similarly, each computer system 22 up to and including the mth computer system 22, may produce results data containing up to k winners.

"Sort by time stamp" 236

Up to m * k potential winners are stored as results data in the response file 234. The judging software 32 may be programmed with a set of judging instructions 37 a priori or coextensively with the broadcast program event 40. The results data are sorted by time stamp 50, or other parameter, according to the set of judging instructions 37.

"List apparent winners" 238

From the potential winners contained in the response file 234, the judging software 32 selects an apparent winner or winners. A small set of apparent winners is determined according to the judging instructions 37. The identification of the apparent winners is passed to the winner(s) assignment software 34.

Winner(s) Assignment Software Flow

Figure 13:
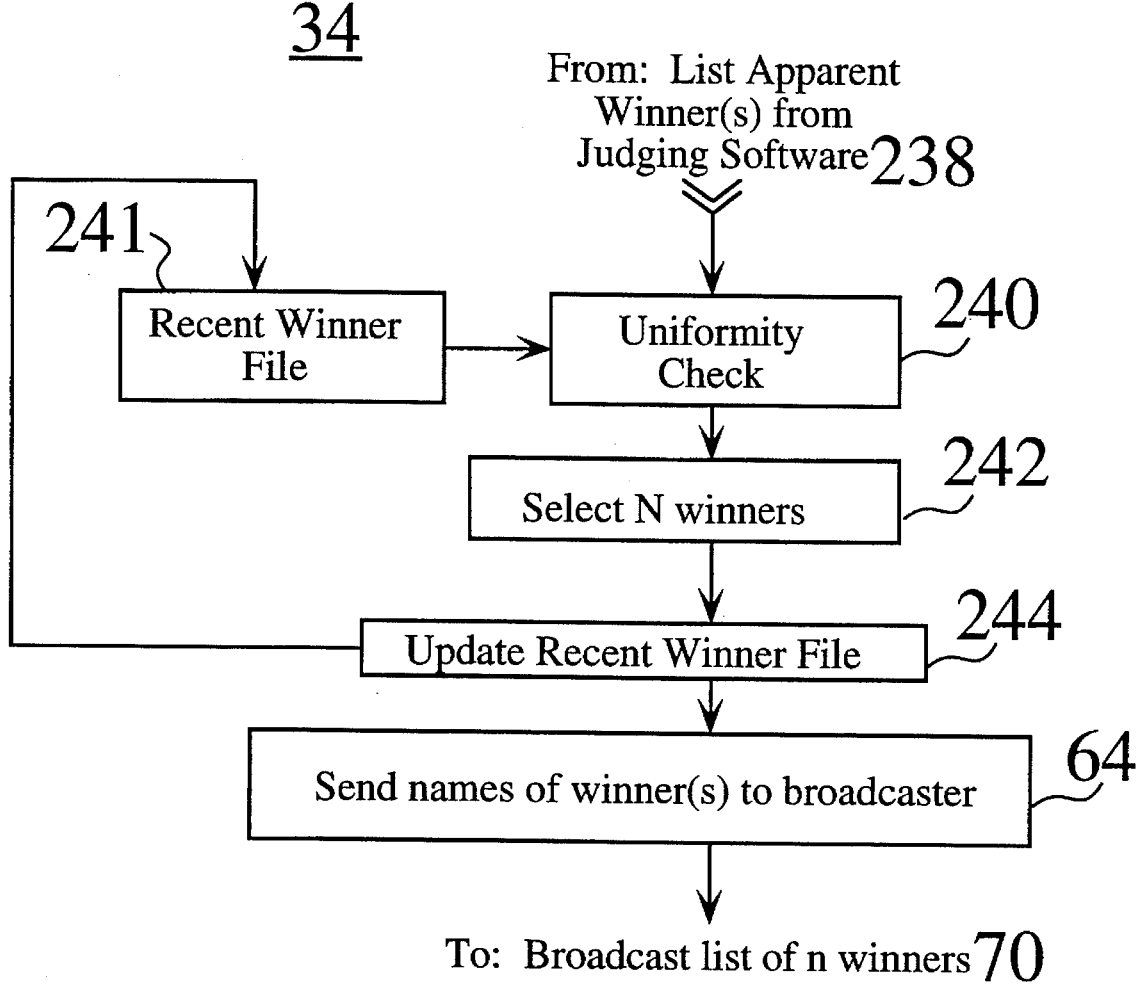
FIG. 13 is a flow diagram showing schematically the processing steps of a winner(s) assignment software, ancillary to the judging software, included in the computer system portion of the invention.

FIG. 13 is a flow diagram schematically showing a typical flow of the winner(s) assignment software 34 applied to the potential winners derived from the judging software 32 at step 238. The steps in the typical flow are described below.

"Uniformity check" 240

The uniformity check routine checks that the set of criteria instructions 35 and the set of judging instructions have been applied uniformly to the viewer responses by the criteria software 30 and the judging software 32. For example, the entire set of apparent winners may be re-sorted by time stamp to verify that the fastest single response in the entire group is considered the winner.

"Select N winners" 242

The winner(s) assignment software 34 is programmed with a set of winner(s) selection rules. For example, the identification of the apparent winners, derived in the "List apparent winners" step 238 is checked against a 'Recent Winner File' 241 to ensure that the game rules respecting how often a participant may be allowed to win are observed. Apparent winners who violate these rules are not selected. This routine compares the identification of the apparent winners to the identification of the those participants whose identification is contained in the 'Recent winners file' 241. The remaining apparent winner or winners are then selected as the winner(s).

"Send names of winner(s) to broadcaster" 64

The broadcaster 36 is then notified 64 of the identification of the selected winner(s). An announcement 66 is prepared for transmission by the broadcast facility 38.

"Broadcast list of winners" 70

The broadcaster 36 takes action to make a broadcast announcement 70 of the winner(s) which then appears in the display 17 on the participant's receiver 12.

Alternative Embodiments of a Televised Program Event

An alternative embodiment of a televised program event 40 presents an action sequence, such as a movie or play, which has one or more branches. In a simple example, a hero reaches a fork in the road and can turn either left or right. Prior to the occurrence of a branch, the action is interrupted and the viewer 16 is prompted 54 to respond with an estimate as to which branch the hero will choose. After an interval for accepting the response of the viewer 16, the action resumes. A winner is selected based on the greatest number of choices correctly estimated. Timeliness or best response time may be an additional winner selection criterion. In such an embodiment, the computer system 22 may be programmed to only accept viewer 16 inputs during the time the action is interrupted. The computer system 22 in such an embodiment selects the winner in real time, a unique advantage of the invention.

Another alternative embodiment of a televised program event 40 is presentation of a selected portion of a motion picture or play wherein the object is for a participating viewer 16 to correctly identify the movie based on the presentation. Such a program event 40 may include the simultaneous viewing of the movie by studio contestants 74 and at-home viewers 16. A portion of the correct answer may be displayed to aid the at-home viewers 16. The movie is stopped whenever any in-studio contestant 74 correctly identifies the movie. Otherwise the movie continues. At home viewers can participate as described earlier, although their correct answers will not stop the movie. A higher level of prizes may be offered to the in-studio contestants 74. An at-home viewer 16 who responds well may be offered an opportunity to become an in-studio contestant 74. A variation of the above alternative embodiment is for the program event 40 to request additional information, such as the name of the actors.

The present invention makes it possible for a viewer 16 remotely located from the broadcast source 10 to participate and compete in real time with contestants 74 at the source 10 of the broadcast.

Although the present invention has been described in detail with reference to particular preferred and alternative embodiments, persons possessing ordinary skill in the art to which this invention pertains will appreciate that various modifications and enhancements may be made without departing from the spirit and scope of the claims that follow. The various modes of broadcasting and broadcast program events that have been disclosed above are intended to educate the reader about one preferred embodiment and several alternative embodiments, and are not intended to constrain or limit the invention or the scope of the claims.

The List of Reference Characters which follows is intended to provide the reader with a convenient means of identifying elements of the invention in the specification and drawings. This list is not intended to delineate or narrow the scope of the claims.

LIST OF REFERENCE CHARACTERS

FIGS. 1 through 5

| | |
|---|---|
| 10 | Broadcast source |
| 12 | Television receiver |
| 14 | Reference clock |
| 16 | Viewer (participant) |
| 17 | Screen display |
| 18 | Telephone |
| 19 | Keypad output |
| 20a | First telephone circuit |
| 20b–n | Other telephone circuits |
| 22 | Computer system |
| 23 | Controller |
| 24 | DTMF Receiver/Microprocessor |
| 25 | Viewer identification software |
| 28 | Main memory |
| 30 | Criteria software |
| 32 | Judging software |
| 34 | Winner(s) assignment software |
| 35 | Criteria instruction set |
| 36 | Broadcaster |
| 37 | Judging instruction set |
| 38 | Television transmitter |
| 40 | Broadcast program event signal |
| 44 | Prompting viewer to dial and participate |
| 46 | Dual-tone multifrequency key pad |
| 48 | Verify code |
| 50 | Time stamp |
| 54 | Prompting viewer to enter response on key pad |
| 56 | Main memory address block |
| 60 | Sort responses |
| 62 | Determine winner |
| 64 | Record winner(s) and notify broadcaster |
| 66 | Announce winners |
| 70 | Broadcast announcement |
| 72 | Television viewer views winners |
| 74 | In-studio participants |
| 76 | Viewer prompted to respond to live broadcast |
| 78 | Broadcast equipment |
| 80 | Live studio contest broadcast |
| LTE | Local telephone exchange |
| T1,–T5 | Universal coordinated time (UCT) periods |

FIG. 6

| | |
|---|---|
| 19 | Keypad output |
| 20a | First telephone circuit |
| 20b–n | Other telephone circuits |

-continued

LIST OF REFERENCE CHARACTERS

| | |
|---|---|
| 23 | Controller |
| 24 | DTMF receiver/microprocessor |
| 28 | Main memory |
| 120 | Flag set signal |
| 121 | Flag reset signal |
| 122 | DTMF receiver |
| 124 | Microprocessor |
| 126 | DTMF receiver digital character output |
| 128 | DTMF receiver steering logic (StD) signal |
| 129 | output enable (TOE) signal |
| 130 | Time synchronization signal |

FIG. 7

| | |
|---|---|
| 19 | Keypad output |
| 24 | DTMF receiver/microprocessor |
| 50 | Attach time stamp to data in memory |
| 120 | Flag set signal |
| 122 | DTMF receiver |
| 124 | Microprocessor |
| 126 | Receiver digital output |
| 128 | Steering logic signal (StD) |
| 129 | Output enable (TOE) signal |
| 130 | Time synchronization signal |
| 131 | Microprocessor memory |
| 132 | Steering logic edge detector, "Positive going edge detected?" |
| 134 | Output enable logic, "Enable TOE and read Q1 through Q4 into memory" |
| 136 | Finish character detector, "Were last three characters '###'?" |
| 138 | Time stamp function, "Time stamp memory for close of transaction" |
| Q1 to Q4 | Receiver output bus |

FIG. 7A

| | |
|---|---|
| 19 | Keypad output |
| 26 | Scanner |
| 28 | Main memory |
| 50 | Attach time stamp to data in memory |
| 122 | DTMF receiver |
| 124 | Microprocessor |
| 126 | Receiver digital output |
| 128 | Steering logic (StD) signal |
| 129 | Output enable (TOE) signal |
| 130 | Time Synchronization signal |
| 132 | Steering logic edge detector, "Positive going edge detected?" |
| 134 | Output enable logic, "Enable TOE and read Q1 through Q4 into memory" |
| 136 | Finish character detector, "Were last three characters '###'?" |
| 138 | Time stamp function, "Time stamp memory at close of the transaction" |
| 139 | Scan to next receiver |
| Q1 to Q4 | Receiver output bus |

FIG. 8

| | |
|---|---|
| 46 | DTMF keypad |
| 140 | Key |

FIG. 10 - System Flow Steps

| | |
|---|---|
| 16 | Viewer |
| 22 | Computer system |
| 40 | Televised program event |
| 44 | Prompt viewer to participate in event |
| 48 | Code verification |
| 50 | Time stamp viewer's response |
| 54 | Prompt viewer to respond to activity |
| 70 | Broadcast winner(s) |
| 144 | TV viewer dials four-digit number |
| 146 | Connect telephone to DTMF receiver/microprocessor |
| 148 | TV viewer dials number followed by finish code (###) |
| 150 | Assign memory location to viewer's responses by viewer ID |
| 160 | Activity number assigned by broadcast |
| 162 | Viewer dials start code (**) plus activity number, plus finish code(###) |

-continued

LIST OF REFERENCE CHARACTERS

| | |
|---|---|
| 164 | Viewer participates by dialing start code (**) and series of characters on keypad |
| 166 | Memory sequence |
| 170 | DTMF receiver/microprocessor reads keypad output and stores response characters in assigned memory location (memory string) |
| 171 | Dial # # # to close |
| 172 | Read out real-time clock |
| 174 | Attach time stamp to memory string |
| 176 | Apply criteria software to memory string |
| 178 | Apply judging software to determine winner |
| 180 | Assign winner(s) to program activity |
| 182 | Notify broadcaster of winner(s) |
| 192 | Prompt viewer to begin a new activity |
| 194 | Viewer initiates a new activity |

FIG. 11 - Criteria Software flow Steps

| | |
|---|---|
| 30 | Criteria software |
| 200 | Game complete or memory block full? |
| 202 | Sort responses in memory blocks for correctness |
| 204 | Discard if incorrect |
| 206 | Sort responses in memory blocks by time stamp |
| 208 | Response too slow? |
| 210 | Discard if response too slow |
| 212 | Response too fast? |
| 214 | Is viewer a "known offender"? |
| 218 | Discard if a "known offender" |
| 220 | List potential winner(s) and results |
| 222 | Pass potential winner(s) and results to judging software |

Figure 12:
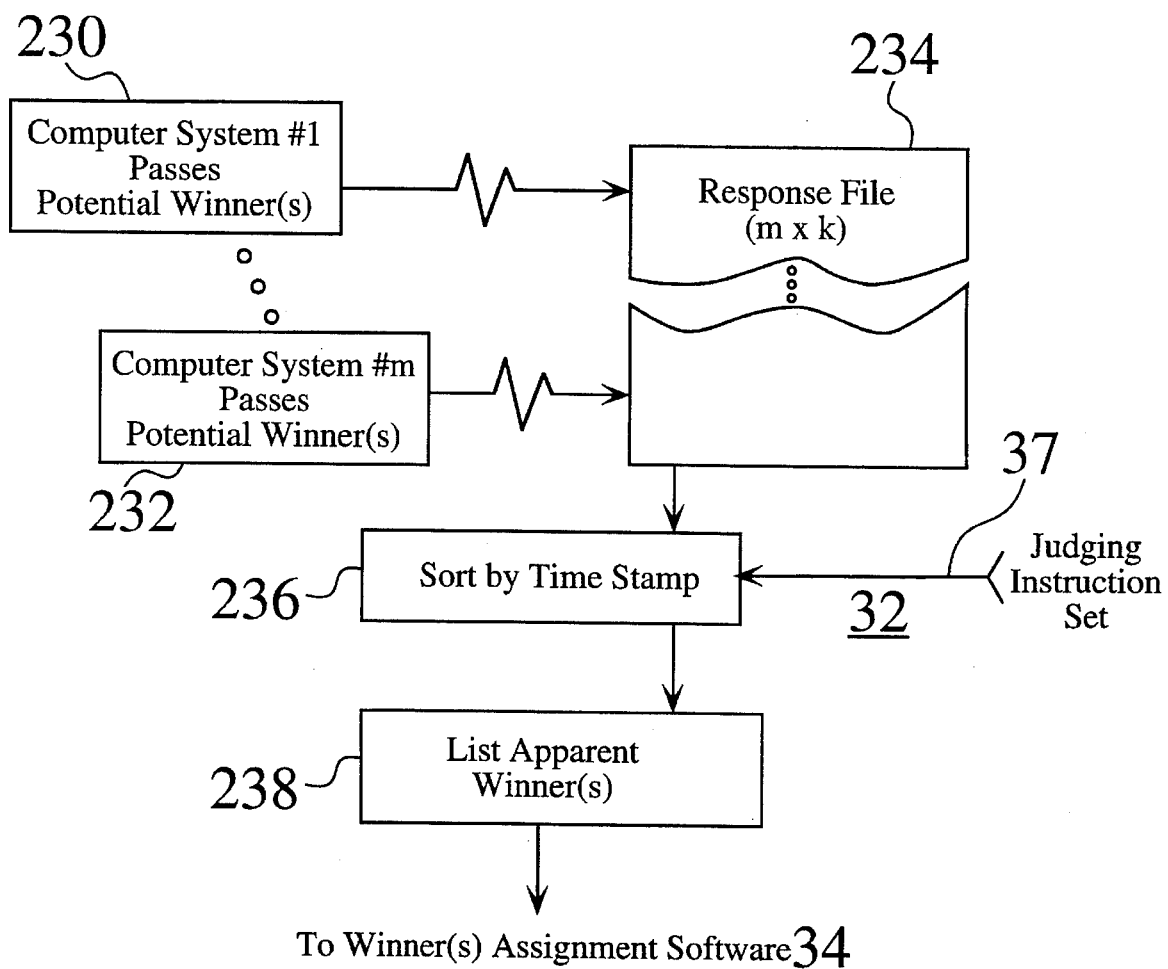
FIG. 12 is a flow diagram showing schematically the processing steps of a judging software included in the computer system portion of the invention.

FIG. 12 - Judging software

| | |
|---|---|
| 32 | Judging software |
| 37 | Judging instruction set |
| 230 | First computer system passes potential winner(s) to judging software |
| 232 | Mth computer system passes potential winner(s) to judging software |
| 234 | Response file |
| 236 | Sort potential winners by time stamp on their responses |
| 238 | List apparent winner(s) and pass to winner(s) assignment software |

FIG. 13 - Winner(s) assignment software flow steps

| | |
|---|---|
| 34 | Winner(s) assignment software |
| 64 | Send name(s) of winner(s) to broadcaster |
| 70 | Broadcast winner(s) name(s) |
| 238 | List of potential winner(s) and results from judging software |
| 240 | Check list of winners and results for uniformity of rule application |
| 241 | Recent winner file |
| 242 | Select N winner(s) |
| 244 | Update recent winner file |

What is claimed is:

1. An interactive television system (40) involving a participant (16) comprising:

a televised program event (40) transmitted by a broadcaster (36) from a television transmitting station (38);

said participant (16) participating in said televised program event (40) simultaneously with a plurality of other participants (74); said participant (16) and each one of said plurality of other participants (74) being remote from another;

a plurality of telephone circuits (20a, b–n) terminating at a local telephone exchange (LTE); said plurality of telephone circuits (20a, b–n) including a first telephone circuit (20a); a plurality of dual-tone multifrequency (DTMF) receivers (122); each one of said plurality of DTMF receivers (122) having an input coupled to one of said plurality of telephone circuits (20a, b–n) through said local telephone exchange (LTE); each of said plurality of DTMF receivers (122) having a digital character output (126) and a steering logic signal (StD) (128); a first one of said plurality of DTMF receivers (122) being accessible by said participant (16) through said first telephone circuit (20a); a telephone (18); said telephone (18) having a DTMF keypad (46) having keys (140); said telephone (18) controlled by said participant (16) and connected to said first one of said plurality of DTMF receivers (122) through said first telephone circuit (20a) when said participant (16) dials an appropriate access number on said DTMF key, pad (46);

a computer system (22) by which said participant (16) takes part in said televised program event by entering responses to said televised program event (40) into said computer system (22) by pressing said keys (140) on said DTMF key pad (46) of said telephone. (18);

a main memory (28) having a memory sequence (166) in which said digital character output. (126) is stored; said memory sequence (166) representing at any moment a sequence of each one of said responses entered by said participant (16), including a finish character (###) (182) at the completion of a sequence of said responses, on said DTMF keypad (46) and input to one of said plurality of DTMF receivers (122) through said first telephone circuit (20a);

a plurality of microprocessor devices (124) each one of which is coupled with one of said plurality of DTMF receivers (122); said digital character output (126) of one, of said plurality of DTMF receivers (122) being stored by one of said plurality of microprocessor devices (124) in said memory sequence (166) in said main memory (28); each one of said plurality of microprocessor devices (124) accepting said digital character output (126) for storing when said steering logic signal (StD) (128) indicates a valid key (140) was pressed on said DTMF key pad (46);

each one of said plurality of microprocessor devices having a detector (132) for detecting a valid keypad output (19) and having an output enable logic (134) for causing said digital character output (126) to be read out into said memory sequence (166);

a microprocessor memory (131) for temporarily storing said digital character output (126) when said digital character output (126) is read out into said memory sequence (166);

said computer system (22) having a viewer identification software (25), a criteria software (30), a judging software (32), a winners' selection software (34), a set of criteria instructions (35) and a set of judging instructions (37); a real-time reference clock (14); said real-time, reference clock (14) providing a time synchronization signal (130);

a time stamp memory (138) for applying a time stamp (50), derived from said time synchronization signal (130), to each said memory sequence (166); said time stamp (50) representing a time when said memory sequence (166) is completed by entry of said finish character (182) by said participant (16);

said responses being associated with said participant (16) by said viewer identification software (25); said responses being sorted and evaluated by said criteria software (30) according to said set of criteria instructions (35); said responses being sorted by said judging software (32) according to said time stamp (50) to determine an apparent winner;

a winner (34) of said televised program event (40) being finally selected according to said set of judging instructions (37) and an identification of said winner being recorded and notification of said winner provided to said broadcaster (36) for announcement (66,70), by said winner's selection software (34).

2. An apparatus for use in an interactive television system involving a participant (16) comprising:

a televised program event (40); said televised program event (40) transmitted by a broadcaster (36) from a television transmitting station (38);

a plurality of telephone circuits (20a, b–n) terminating at a local telephone exchange (LTE); said plurality of telephone circuits (20a, b–n) having a first telephone circuit (20a);

said participant (16) being one of a plurality of other participants (74) each one of said plurality of participants (74) being remote from another; said participant (16) simultaneously and, in a like manner, participating in said televised program event (40) with said plurality of other participants (74), each through one of said plurality of telephone circuits (20a–n);

a computer system (22) accessible from said plurality of telephone circuits (20a, b–n); said computer system (22) having a viewer identification software (25), a criteria software (30), a judging software (32, 34), a winner's assignment software (34), a set of criteria instructions (35) and a set of judging instructions (37);

a telephone (18) having a DTMF keypad (46) having keys (140), said telephone (18) controlled by said participant (16) and connected to said computer system (22) through said first telephone circuit (20a) when said participant (16) dials an appropriate access number on said DTMF key pad (46);

said participant (16) participating in said televised program event (40) by entering responses into said computer system (22) by pressing said keys (140) on said DTMF key pad (46) of said telephone (18);

said viewer identification software (25) associating said responses with said participant (16); said criteria software (30) sorting and evaluating said responses according to said set of criteria instructions (35); said judging software (32) selecting a winner of said interactive televised program event (40) according to said set of judging instructions (37); said winner's assignment software (34) supplying the identification of said winner (34) to said broadcaster (36) for announcement (66, 70).

a dual tone multifrequency (DTMF) receiver (122), which is accessible by said participant (16) through said first telephone circuit (20a); said DTMF receiver (122) having a digital character output (126) and a steering logic signal (StD) (128); said DTMF receiver (122) having an input coupled to one of said plurality of telephone circuits (20a, b–n) through said local telephone exchange (LTE);

a main memory (28) for storing said digital character output (126) in a memory sequence (166); said memory sequence (166) representing at any moment a sequence of each one of said responses entered by said participant (16) on said DTMF keypad (46) and input to said DTMF receiver (122) through said first telephone circuit (20a); said participant (16) entering a finish character (182) on said DTMF keypad (46) when said sequence of said responses is completed;

a microprocessor device (124); said microprocessor device (124) coupled to said DTMF receiver (122) and to said main memory (28); said microprocessor device (124) enabling storage of said digital character output (126) of said DTMF receiver (122) in said main memory (28), in said memory sequence (166); said microprocessor device (124) accepting said digital character output (126) for storing when said steering logic signal (128) indicates a valid key (140) was pressed on said DTMF key pad (46);

said microprocessor device (124) having a steering logic signal edge detector (132) for detecting when a valid digital character output (126) resides in an output latch of said DTMF receiver (122), and having an output enable logic (134) for causing said digital character output (126) to be read out into said memory sequence (166);

a microprocessor memory (131) for temporarily storing said digital character output (126) when said digital character output (126) is read out into said memory sequence (166);

a real-time clock (172); said real time clock (172) providing a time synchronization signal (130); and a time stamp memory (138) for applying a time stamp (50), derived from said time synchronization signal (130), to each said memory sequence (166); said time stamp (50) representing a time when said memory sequence (166) is completed by entry of said finish character (182) by said participant (16).

3. A method of conducting an interactive television communication involving a participant (16) comprising the steps of:

transmitting a televised program event (40) from a television transmitting station (38) by a broadcaster (36); said participant (16) being one of a plurality of participants (74) and participating in said televised program event (40) simultaneously and in a like manner with others of said plurality of participants (74); said participant (16) and each one of said plurality of participants (74) being remote from another;

providing a plurality of telephone circuits (20a, b–n) terminating at a local telephone exchange (LTE); said plurality of telephone circuits (20a, b–n) including a first telephone circuit (20a);

providing a computer system (22) accessed through said plurality of telephone circuits (20a, b–n); said computer system (22) having at least one dual tone multifrequency (DTMF) receiver (122) and at least one microprocessor device (124);

providing a telephone (18); said telephone (18) having a dual tone multifrequency (DTMF) keypad (46) having keys (140); said telephone (18) controlled by said participant (16);

connecting said telephone (18) to said dual tone multifrequency (DTMF) receiver (122) through said first telephone circuit (20a) when said participant (16) dials an appropriate access number on said DTMF key pad (46);

said participant (16) taking part in said televised program event (40) by entering responses to said televised program event (40) into said computer system (22) by pressing said keys (140) on said DTMF key pad (46), including a finish character (###) at the completion of a sequence of said responses;

producing a digital character output (126) and a steering logic signal (StD) (128) with said DTMF receiver (122) from said responses which are coupled to said first telephone circuit (20a);

storing said digital character output (126) in a memory sequence (166) in a main memory (28) in said computer system (22) by routing said digital character output (126) to said microprocessor device (124) which then stores said digital character output (126) in said memory sequence (166) when said steering logic signal (StD) (128) indicates a valid key (140) was pressed on said DTMF key pad (46);

said memory sequence (166) representing at any moment a sequence of each one of said responses entered by said participant (16) on said DTMF keypad (46) and input to said DTMF receiver (122) through said first telephone circuit (20a);

said microprocessor device (124) having a detector (132) for detecting said steering logic signal (128) and having an output enable logic (134) for causing said digital character output (126) to be read out into said memory sequence (166) when said steering logic signal (128) is detected;

said microprocessor device (124) having a microprocessor memory (131) for temporarily storing said digital character output (126) when said digital character output (126) is read out into said memory sequence (166);

providing said computer system (22) with a viewer identification software (25), a criteria software (30), a judging software (32), a winners' selection software (34), a set of criteria instructions (35) and a set of judging instructions (37);

providing a time synchronization signal (130) with a real-time reference clock (14);

applying a time stamp (50) with a time stamp memory (138) to each said memory sequence (166);
said time stamp (50) derived from said time synchronization signal (130); said time stamp (50) representing a time when said memory sequence (166) is completed by entry of said finish character (###) (182) by said participant (16);

associating said responses with said participant (16) and other responses with each one of said plurality of other participants (74) with said viewer identification software (25);

sorting and evaluating all of said responses with said criteria software (30) according to said set of criteria instructions (35);

sorting all of said responses with said judging software (32) according to said time stamp (50) to determine an apparent winner;

selecting a final winner (34) of said televised program event (40) according to said set of judging instructions (37); and recording said identification of said winner and providing notification of said winner to said broadcaster (36) for announcement (66,70) with said winner's selection software (34).

\* \* \* \* \*